(12) United States Patent
Obrador

(10) Patent No.: US 7,917,518 B2
(45) Date of Patent: Mar. 29, 2011

(54) COMPOSITIONAL BALANCE AND COLOR DRIVEN CONTENT RETRIEVAL

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 920 days.

(21) Appl. No.: 11/781,178

(22) Filed: Jul. 20, 2007

(65) Prior Publication Data

US 2009/0024580 A1    Jan. 22, 2009

(51) Int. Cl.
*G06F 7/00* (2006.01)
*G06F 17/30* (2006.01)
(52) U.S. Cl. ......... 707/748; 707/755; 707/769; 707/915
(58) Field of Classification Search .................. 707/736, 707/737, 748, 749, 758, 913, 915, 999.003
See application file for complete search history.

(56) References Cited

U.S. PATENT DOCUMENTS

| | | | | |
|---|---|---|---|---|
| 5,418,895 | A * | 5/1995 | Lee | 345/604 |
| 6,671,405 | B1 * | 12/2003 | Savakis et al. | 382/203 |
| 7,031,555 | B2 | 4/2006 | Troyanker | |
| 7,043,474 | B2 * | 5/2006 | Mojsilovic et al. | 707/6 |
| 7,136,511 | B2 | 11/2006 | Harrington et al. | |
| 7,451,140 | B2 * | 11/2008 | Purvis et al. | 707/5 |
| 2002/0078043 | A1 | 6/2002 | Pass et al. | |
| 2003/0012428 | A1 * | 1/2003 | Syeda-Mahmood | 382/162 |
| 2005/0254727 | A1 | 11/2005 | Fedorovskaya | |
| 2006/0015496 | A1 | 1/2006 | Keating et al. | |
| 2006/0101060 | A1 * | 5/2006 | Li et al. | 707/102 |
| 2006/0110062 | A1 | 5/2006 | Chiang et al. | |
| 2006/0257050 | A1 | 11/2006 | Obrador | |
| 2007/0091106 | A1 | 4/2007 | Moroney | |
| 2007/0133842 | A1 | 6/2007 | Harrington | |
| 2008/0037877 | A1 * | 2/2008 | Jia et al. | 382/224 |

FOREIGN PATENT DOCUMENTS

JP    10-149373    6/1998

OTHER PUBLICATIONS

Markkula, M.and Sormunen, E., "End-user searching challenges indexing practices in the digital newspaper photo archive," Information retrieval, 1:259-285, 2000.
Martinet, J., Chiaramella, Y. and Mulhem, P. "A model for weighting image objects in home photographs." in ACM CIKM'05, pp. 760-767, Bremen, Germany, 2005.
Obrador, P. "Automatic color scheme picker for document templates based on image analysis and dual problem," in Proc. SPIE, vol. 6076, San Jose, CA, 2006.
Obrador, P., "Content Selection based on Compositional Image Quality," in Proc. SPIE, vol. 6500, San Jose, CA 2007.
Savakis, A., Etz, S., and Loui A., "Evaluation of image appeal in consumer photography," in Proc. SPIE vol. 3959, 2000.

(Continued)

*Primary Examiner* — James Trujillo
*Assistant Examiner* — Marc Somers

(57) ABSTRACT

For each image in a collection of images, a respective model of visual weight in the image and a respective model of color in the image are determined. An image query is generated from a target visual weight distribution and a target color template. For each of the images a respective score is calculated from the image query, the respective visual weight model, and the respective color model. At least one of the images is retrieved from a database based on the respective scores.

22 Claims, 15 Drawing Sheets

OTHER PUBLICATIONS

Smith, R. J. and Chang, S.-F. "Integrated Spatial and Feature Image Query, Multimedia Systems, 7(2):129-140, 1999.".

M. Cadik et al., "Image attributes and quality for evaluation of tone mapping operators," in Proc. Pacic Graphics 2006, p. 35-44, National Taiwan U. Press, Taipei, Taiwan 2006.

H. Balinsky, "Evaluating interface aesthetics: a measure of symmetry", Digital Publishing Conference/IS & T/SPIE Int'l Symp. on Electronic Imaging, Jan. 2006, San Jose, CA USA.

S.J Harrington, J.F. Naveda, R.P. Jones, P. Roetling and N. Thakkar, "Aestheticmeasures for automated document layout", ACM Symposium on document engineering, 2004.

P. Obrador, "Multiresolution Color Patch Extraction", Electronic Imaging, VCIP Jan. 18, 2006, San Jose, CA USA.

H. Li and K.N. Ngan, "Unsupervised segmentation of defocused video based on matting model", ICIP 2006, Atlanta.

R. Ferzli and L. J. Karam, "A Human Visual System-Based Model for Blur/Sharpness Perception," 2nd Int'l Wkshop Vid. Process. and Qual. Metrics for Consumer Electr., Jan. 2006.

Shaked, D. and Tastl, I. , "Sharpness measure: towards automatic image enhancement", ICIP 2005. Sep. 11-14, 2005, vol. 1, on pp. I-937-40.

L. Itti, C. Koch, E. Niebur, "A model of saliency-based visual attention for rapid scene analysis", IEEE trans. on pat. analysis and mach. intel., (20)11:1254-1259 (1998).

Chao, H., Fan, J., "Layout and Content Extraction for PDF Documents." in proceeding of IAPR Int. workshop on Document Analysis System, 2004.

Bajcsy, R. "Active Perception", Proceedings of the IEEE, vol. 76, No. 8, pp. 996-1005, 1988.

Corridoni et al., "Querying and retreiving pictorial data using semantics induced by colour quality and arrangement," Proc. Multimedia, 1996.

G. M. Johnson and M. D. Fairchild, "Measuring images: Differences, Quality, and Appearance," Proc SPIE/IS&T Electronic Imaging Conference, Santa Clara, 5007, 51-60 (2003).

"CopySpace(TM)—How it works," iStock International, http://www.istockphoto.com/copyspace_guide.php (downloaded Jul. 13, 2007).

Li-Qun Chen et al., "A visual attention model for adapting images on small displays," ACM Multimedia Systems Journal, 9(4):353-364, Nov. 2003.

Bringier et al., "No-reference perceptual quality assessment of colour image," EUSIPCO 2006, Florence, Italy (Sep. 4-8, 2006).

Oge Marques et al., "An attention-driven model for grouping similar images with image retrieval applications," EURASIP J. Adv. Sig Proc., v2007.

N. Burningham et al., "Image Quality Metrics," Processing, Image Quality, Image Capture Systems Conference (2003).

H. de Ridder et al., "Naturalness and image quality: chroma and hue variation in color images of natural scenes", Proceedings of SPIE 2411, 51-61 (1995).

Vasile, A., Bender, W.R. Image query based on color harmony, in Proc. SPIE vol. 4299, San Jose, CA, 2001.

* cited by examiner

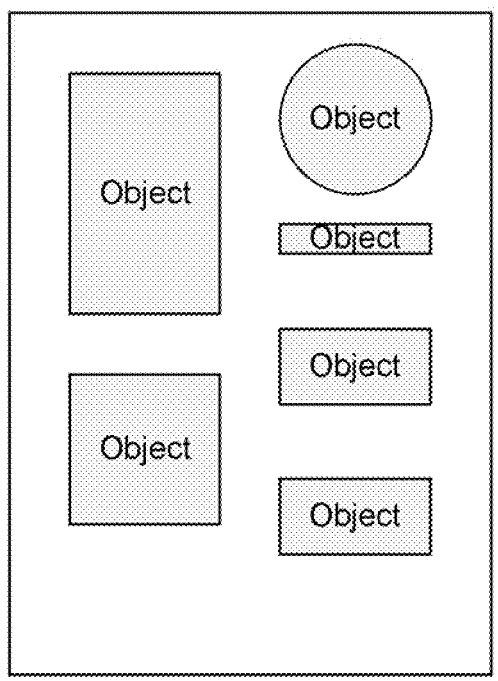
FIG. 3A
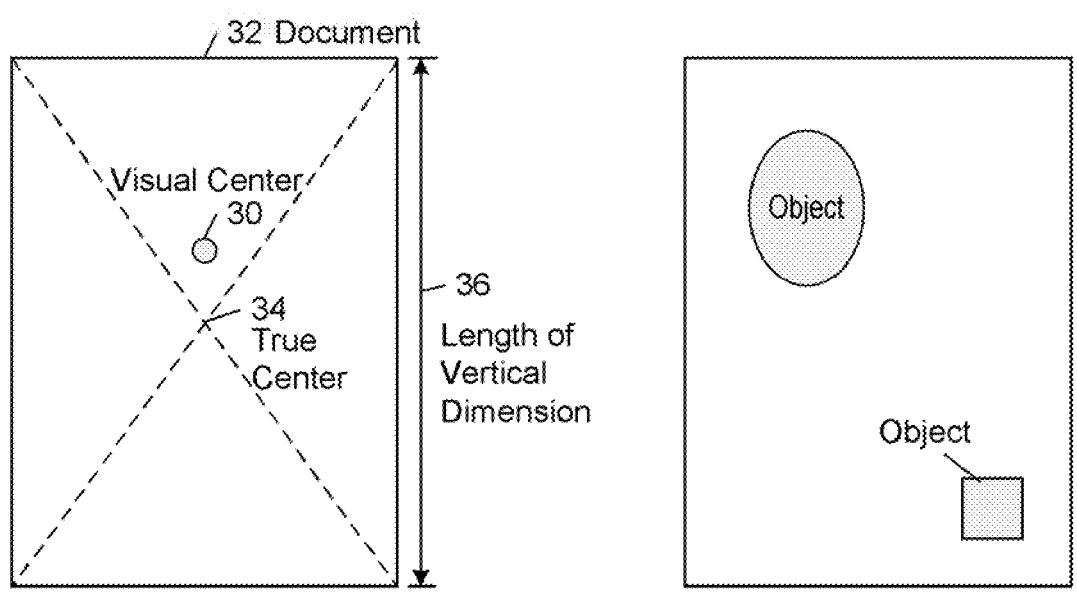
FIG. 3B
FIG. 3C

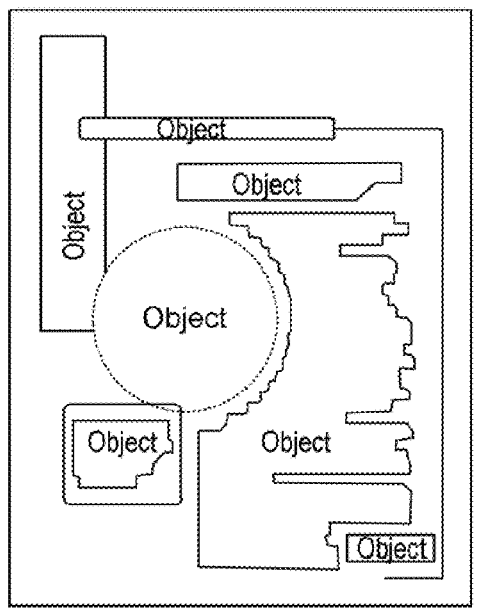
FIG. 20
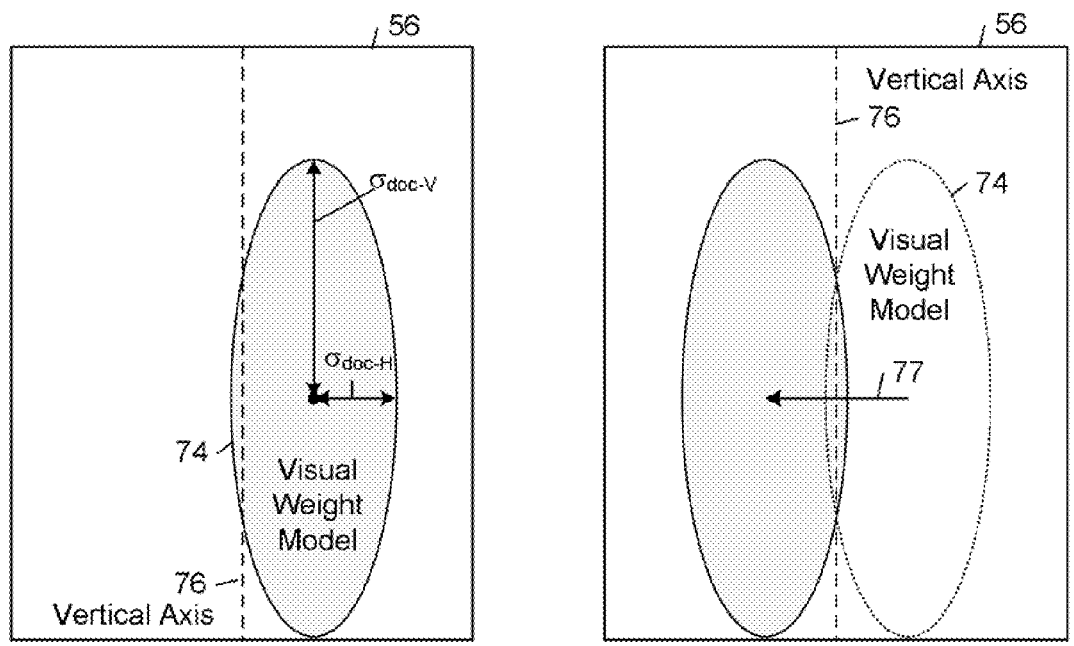
FIG. 21
FIG. 22

COMPOSITIONAL BALANCE AND COLOR DRIVEN CONTENT RETRIEVAL

CROSS-REFERENCE TO RELATED APPLICATIONS

This application relates to the following co-pending applications, each of which is incorporated herein by reference:

U.S. patent application Ser. No. 11/496,146, filed Jul. 31, 2006;

U.S. patent application Ser. No. 11/495,846, filed Jul. 27, 2006;

U.S. patent application Ser. No. 11/495,847, filed Jul. 27, 2006;

U.S. patent application Ser. No. 11/127,278, filed May 12, 2005; and

U.S. patent application Ser. No. 11/259,597, filed Oct. 25, 2005

BACKGROUND

Individuals and organizations are rapidly accumulating large collections of digital content, including text, audio, graphics, animated graphics and full-motion video. This content may be presented individually or combined in a wide variety of different forms, including documents, presentations, still photographs, commercial videos, home movies, and meta data describing one or more associated digital content files. As these collections grow in number and diversity, individuals and organizations increasingly will require systems and methods for retrieving the digital content from their collections.

Among the ways that commonly are used to retrieve digital content from a collection are browsing methods and text-based retrieval methods. Browsing methods involve manually scanning through the content in the collection. Browsing, however, tends to be an inefficient way to retrieve content and typically is useful only for small content collections. Text-based retrieval methods involve submitting queries to a text-based search engine that matches the query terms to textual metadata that is associated with the content. Text-based retrieval methods typically rely on the association of manual annotations to the content, which requires a significant amount of manual time and effort.

Content-based retrieval methods also have been developed for retrieving content based on the actual attributes of the content. Content-based retrieval methods involve submitting a description of the desired content to a content-based search engine, which translates the description into a query and matches the query to one or more parameters that are associated with the content. Some content-based retrieval systems support query-by-text, which involves matching query terms to descriptive textual metadata associated with the content. Other content-based retrieval systems additionally support query-by-content, which involves interpreting a query that describes the content in terms of attributes such as color, shape, and texture, abstractions such as objects, roles, and scenes, and subjective impressions, emotions, and meanings that are assigned to the content attributes. In some content-based image retrieval approaches, low level visual features are used to group images into meaningful categories that, in turn, are used to generate indices for a database containing the images. Exemplary low level features include texture, shape, and layout. The parameters (or terms) of an image query may be used to retrieve images in the databases that have indices that match the conditions in the image query. In general, the results of automatic categorization and indexing of images improve when the features that are used to categorize and index images accurately capture the features that are of interest to the person submitting the image queries.

A primary challenge in the design of a content-based retrieval system involves identifying meaningful attributes that can be extracted from the content and used to rank the content in accordance with the degree of relevance to a particular retrieval objective.

SUMMARY

In one aspect, the invention features a method in accordance with which for each image in a collection of images a respective model of visual weight in the image and a respective model of color in the image are determined. An image query is generated from a target visual weight distribution and a target color template. For each of the images a respective score is calculated from the image query, the respective visual weight model, and the respective color model. At least one of the images is retrieved from a database based on the respective scores.

The invention also features apparatus and machine readable media storing machine-readable instructions for implementing the method described above.

Other features and advantages of the invention will become apparent from the following description, including the drawings and the claims.

DESCRIPTION OF DRAWINGS

FIG. 3A is a diagrammatic view of a document that has a left-right symmetrical balance distribution of constituent objects.

FIG. 3B is a diagrammatic view of a document showing the visual center of the document and the true center of the document.

FIG. 3C is a diagrammatic view of a document that has a centered symmetrical balance distribution of constituent objects.

FIG. 20 is a diagrammatic view of a document that has a plurality of objects arranged in a compositional layout.

FIG. 21 is a diagrammatic view of an embodiment of a model of visual weight in the document shown in FIG. 20.

FIG. 22 is a diagrammatic view of a reflection of the visual weight model of FIG. 21 about a central vertical axis of the document shown in FIG. 20.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail herein are capable of retrieving images (e.g., digital photographs, video frames, scanned documents, and other image-based graphic objects including mixed content objects) based on specified compositional balance and color criteria. In some of these embodiments, images are indexed in accordance with models of their respective distributions of visual weight and color. Images are retrieved based on comparisons of their associated visual weight and color based indices with the parameters of the compositional balance and color driven image queries.

Some embodiments are able to generate compositional balance and color driven queries from analyses of the distributions of visual weight and color in a document and a specified compositional balance objective. In this way, these embodiments may be used, for example, in digital publishing application environments to automatically retrieve one or more images that have colors that harmonize with a document under construction and that satisfy a compositional balance objective for the document.

II. Overview

Figure 1:
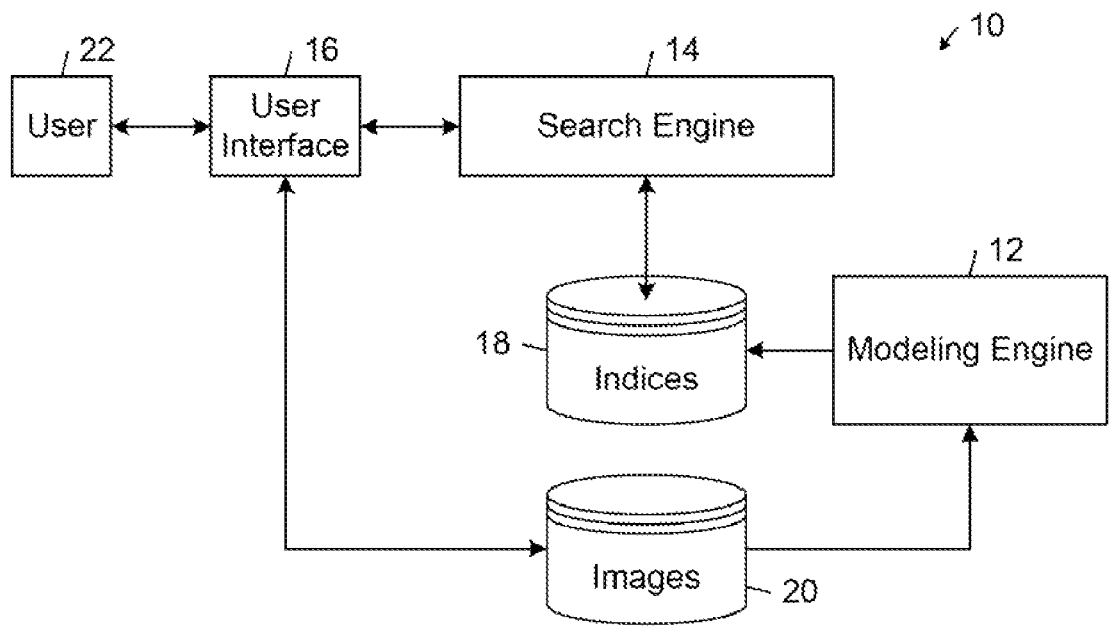
FIG. 1 is a block diagram of an embodiment of a compositional balance and color driven content retrieval system.

FIG. 1 shows an embodiment of a compositional balance and color driven content retrieval system 10 that includes a modeling engine 12, a search engine 14, and a user interface 16. The modeling engine 12 builds a respective index 18 for each of the images 20 in a collection. The images 20 may be stored in one or more local or remote image databases. Each of the indices 18 typically is a pointer to a respective one of the images 20. The search engine 14 receives search parameters from the user interface 16, constructs image queries from the received parameters, compares the image queries to the indices 18, and returns to the user interface 16 ones of the indices 18 that are determined to match the image queries. The user interface 16 allows a user 22 to interactively specify search parameters to the search engine 14, browse the search results (e.g., thumbnail versions of the matching images), and view ones of the images that are associated to the matching indices returned by the search engine 12.

Figure 2:
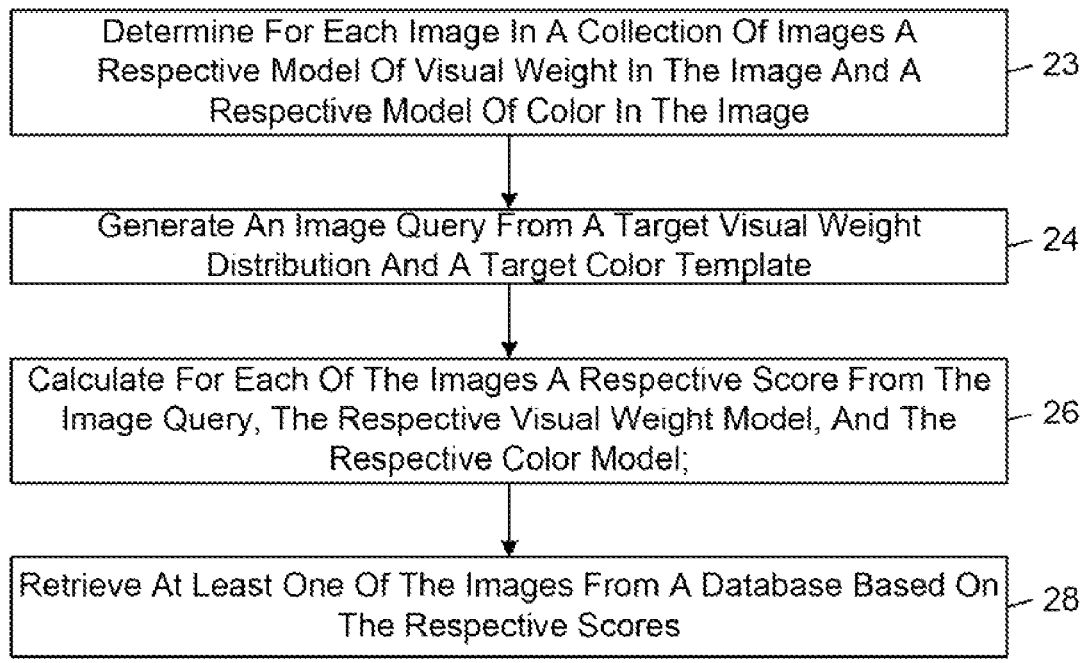
FIG. 2 is a flow diagram of an embodiment of a compositional balance and color driven content retrieval method.

FIG. 2 shows an embodiment of a compositional balance and color driven content retrieval method that is implemented by the compositional balance and color driven content retrieval system 10 to enable a compositional balance and color driven content retrieval of images from the one or more local or remote image databases.

The modeling engine 12 determines for each of the images 20 a respective model of visual weight in the image and a respective model of color in the image (FIG. 2, block 23). In this process, the modeling engine 12 typically extracts features (or attributes) from each image 20 and constructs the respective visual weight model and the respective color mode from the extracted features. The modeling engine 12 creates for each of the images 20 a respective index 18 from parameters of the respective visual weight and color models and associates the respective index to the corresponding image. The modeling engine 12 may store the indices 18 in a database separate from the images (as shown in FIG. 1) or it may store the indices with metadata that is associated with corresponding ones of the images 20. The modeling engine 12 typically performs the visual weight and color modeling of the images 20 as an offline process.

The search engine 14 generates an image query from a target visual weight distribution and a target color template (FIG. 2, block 24). In some embodiments, the compositional balance and color driven content retrieval system 10 infers the target visual weight distribution and the target color template automatically from an analysis of a document being constructed by the user and a specified compositional balance objective for the document. In other embodiments, the compositional balance and color driven content retrieval system 10 receives from the user interface 16 a direct specification by the user 22 of the target visual weight distribution and the target color template for the images to be retrieved by the system 10.

The compositional balance and color driven content retrieval system 10 calculate for each of the images a respective score from the image query, the respective visual weight model, and the respective color model (FIG. 3, block 26) and retrieves at least one of the images from a database based on the respective scores (FIG. 2, block 28). In this process, the search engine 14 compares the image query to the indices 18 and returns to the user interface 16 ones of the indices 18 that are determined to match the image queries. The search engine 14 ranks the indices 18 based on a scoring function that produces values indicative of the level of match between the image query and the respective indices 18, which define the respective models of visual weight and color in the images 20. The user 22 may request the retrieval of one or more of the images 20 associated to the results returned by the search engine 14. In response, the user interface 16 (or some other application) retrieves the requested images from the one or more local or remote image databases. The user interface 16 typically queries the one or more databases using ones of the indices returned by the search engine 14 corresponding to the one or more images requested by the user 22.

III. Compositional Balance

Compositional balance refers to a quality of a composition (or layout) of objects in a document. In particular, compositional balance refers to the degree to which the visual weight distribution of the objects in the document conforms to a compositional objective.

Visual weight (also referred to as "optical weight" or "dominance") of an object refers to the extent to which the object stands out in a particular composition. The visual weight typically is affected by the object's shape, color, and size. In some embodiments, the visual weight of an object is defined as its area times its optical density.

Common compositional objectives include symmetrical balance, asymmetrical balance, and centered balance.

Symmetrical balance gives a composition harmony, which gives a feeling of permanence and stability. One type of symmetrical balance is bilateral symmetry (or axial symmetry), which is characterized by one side of a composition mirroring the other. Examples of bilateral symmetry include left-right bilateral symmetry and top-bottom bilateral symmetry. FIG. 3A shows an example of a composition of objects that is characterized by left-right symmetrical balance. Another type of symmetrical balance is radial symmetry, which is characterized by the composition being mirrored along both horizontal and vertical axes.

Asymmetrical balance gives a composition contrast, which creates interest. Asymmetrical balance typically is achieved by laying out objects of unequal visual weight about a point (referred to as the "fulcrum") in the composition such that objects having higher visual weight are closer to the fulcrum than objects that have lower visual weight. The fulcrum may correspond to the center (i.e., the true center) of a document, but it more commonly corresponds to a visual center (also referred to as the "optical center") of the document. As shown in FIG. 3B, the visual center 30 of a document 32 typically is displaced from the true center 34 of the document 32. The visual center commonly is displaced from the true center toward the top of the document a distance that is approximately 12.5% (or one-eighth) of the length of the vertical dimension 36 of the document. One type of asymmetrical balance is centered asymmetrical balance, which is characterized by an arrangement of objects of unequal weight that are balanced about a fulcrum located at a central point (typically the visual center) in a document. FIG. 3C shows an example of a composition of objects that is characterized by centered asymmetrical balance.

A composition is center balanced when the center of visual weight of the objects coincides with the visual center of the document in which the objects are composed. The objects in the composition shown in FIG. 3C are center balanced.

IV. Color Harmony

Color harmony refers to color combinations (typically referred to as "color schemes") that have been found to be pleasing to the human eye. Typically, the relationships of harmonic colors are described in terms of their relative positions around a "color wheel", which shows a set of colors arranged around the circumference of a circle.

Figure 4:
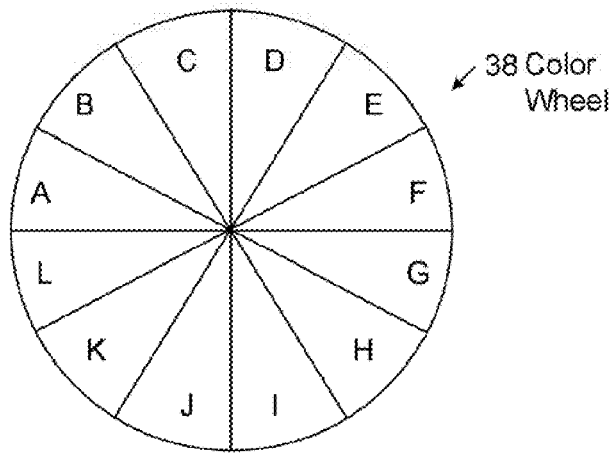
FIG. 4 a diagrammatic view of an exemplary color wheel.

FIG. 4 shows an exemplary color wheel 38 that includes twelve colors. Complementary colors are located opposite each other on the color wheel (e.g., colors A and G are complementary colors). Split complementary colors include includes a main color and the two colors on each side of its complementary color on the opposite side of the color wheel (e.g., if color A is the main color, the split complementary colors are colors F and H). Related or analogous colors are located next to each other on the color wheel (e.g., colors A and B are related colors). Monochromatic colors are colors with the same hue but different tones, values, and saturation. Monochromatic colors are represented by a single respective color in the color wheel 38.

V. Segmenting an Image

In the illustrated embodiments, the models of visual weight and color in the images 20 are generated based on a region- (or object-) based processing of the images 20. In general, the images 20 may be segmented in a wide variety of different ways.

Figure 5:
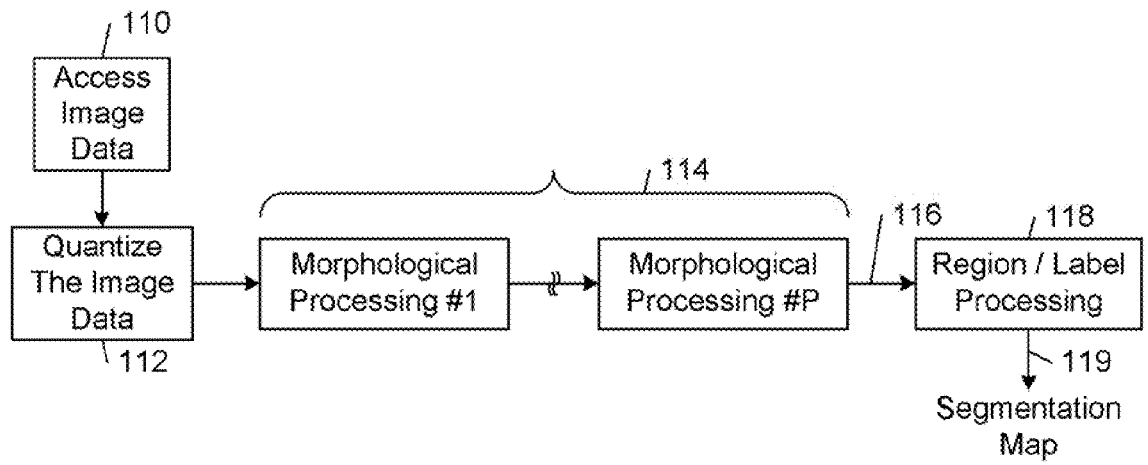
FIG. 5 is a block diagram of an embodiment of a method of segmenting an image.

FIG. 5 is a block diagram of an exemplary embodiment of a method of segmenting an input image by extracting color patches in a way that maintains edges and detail regions.

In accordance with the method of FIG. 5, the modeling engine 12 accesses image data of the input image being processed (FIG. 5, block 110). In some embodiments, the image data are the color values (e.g., RGB values) of image forming elements (e.g., pixels) in the input image. In some embodiments, the modeling engine 12 may convert the image data to a desired color space (e.g., the Commission Internationale de l'Eclairage (CIE)/Lab color space) before proceeding to the next processing stage.

The modeling engine 12 quantizes the image data (FIG. 5, block 112). In this process, the input image is quantized in accordance with a quantization table (or color palette). In one embodiment, lexical quantization is performed, for example, using one or more of the lexical quantization methods described in U.S. patent application Ser. No. 11/259,597, filed Oct. 25, 2005. In this process, individual image forming elements of the input image are associated with one of a plurality of lexical color names. Lexical quantization allows for a discrete outcome permitting filtering of non-consistent colors within a color patch or region. The result of the quantization process is a set of sparsely quantized images.

The modeling engine 12 performs color morphological processing of the quantized image data (FIG. 5, stage 114). This process may include P levels of morphological processing (filtering) at different resolutions, where P has a positive integer value greater than zero. The output 116 of the morphological processing stage 114 identifies a plurality of regions of the input image. The constituent image forming elements in each of these regions have a common characteristic, such as a consistent color corresponding to one of the lexical color names in the quantization table.

The modeling engine 12 performs region/label processing of the input image based on the output 116 of the morphological processing stage 114 (FIG. 5, block 118). In the course of the region/label processing, the regions are labeled using lexical color names according to the consistent colors of the respective regions. In addition, some of the regions that are identified by the morphological processing of step S44 may be merged. For example, regions are merged if the modeling engine 12 determines that the regions correspond to a single portion or object of an original image (e.g., due to a color gradient occurring in the portion or object causing the lexical quantization of the portion or object to be classified into plural regions). The resulting segmentation map 119 is used by the modeling engine 12 to produce the visual appeal map, as described in detail below.

Additional details regarding the operation and various implementations of the color-based segmentation method of FIG. 5 are described in the following references, each of which is incorporated herein by reference: U.S. patent application Ser. No. 11/495,846, filed Jul. 27, 2006; U.S. patent application Ser. No. 11/495,847, Jul. 27, 2006; U.S. patent application Ser. No. 11,259,597, filed Oct. 25, 2005; Pere Obrador, "Multiresolution Color Patch Extraction," SPIE Visual Communications and Image Processing, San Jose, Calif., USA, pp. 15-19 (January 2006); and Pere Obrador, "Automatic color scheme picker for document templates based on image analysis and dual problem," in Proc. SPIE, vol. 6076, San Jose, Calif. (January 2006).

VI. Compositional Balance and Color Driven Content Retrieval

A. Indexing Images for Compositional Balance and Color Driven Content Retrieval 1. Overview The modeling engine 12 determines respective models of visual weight and color in the images 20 (see FIG. 2, block 23). In this process, the modeling engine 12 typically extracts features from each image 20 and constructs respective models of visual weight and color in the image from the extracted features. In the embodiments described in detail below, the modeling engine 12 generates the visual weight model based on a model of image visual appeal that correlates with visual weight. The color model captures spatial and color parameters that enable the search engine 14 to determine the closeness between the color template defined in the image query and the color morphology in the images 20. In this way, these embodiments are able to preferentially retrieve visually appealing images that meet the compositional balance and color criteria specified in the image queries.

2. Producing a Visual Weight Map of an Image a. Overview

In some embodiments, the visual weight map of an input image is produced from a visual appeal map of the input image.

Figure 6:
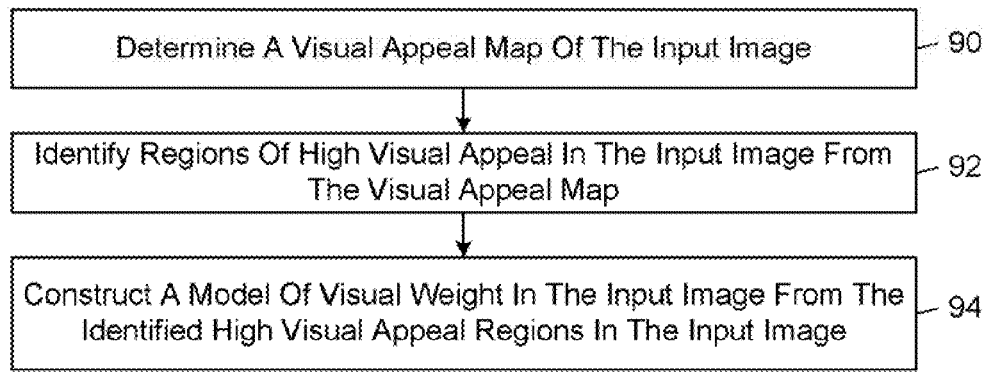
FIG. 6 is a flow diagram of an embodiment of a method of constructing a visual weight model of an image from a visual appeal map.

FIG. 6 shows an embodiment of a method by which the modeling engine 12 constructs a visual weight model of an input image from a visual appeal map. The input image is an image selected from the collection of images 20 that will be indexed by the visual weight indices 18 (see FIG. 1).

In accordance with the method of FIG. 6, the modeling engine 12 determines a visual appeal map of the input image (FIG. 6, block 90). The visual appeal map has values that correlate with the perceived visual quality or appeal of the corresponding areas of the input image. The modeling engine 12 identifies regions of high visual appeal in the input image from the visual appeal map (FIG. 6, block 92). The modeling engine 12 constructs a model of visual weight in the input image from the identified high visual appeal regions in the input image (FIG. 6, block 94).

Figure 7:
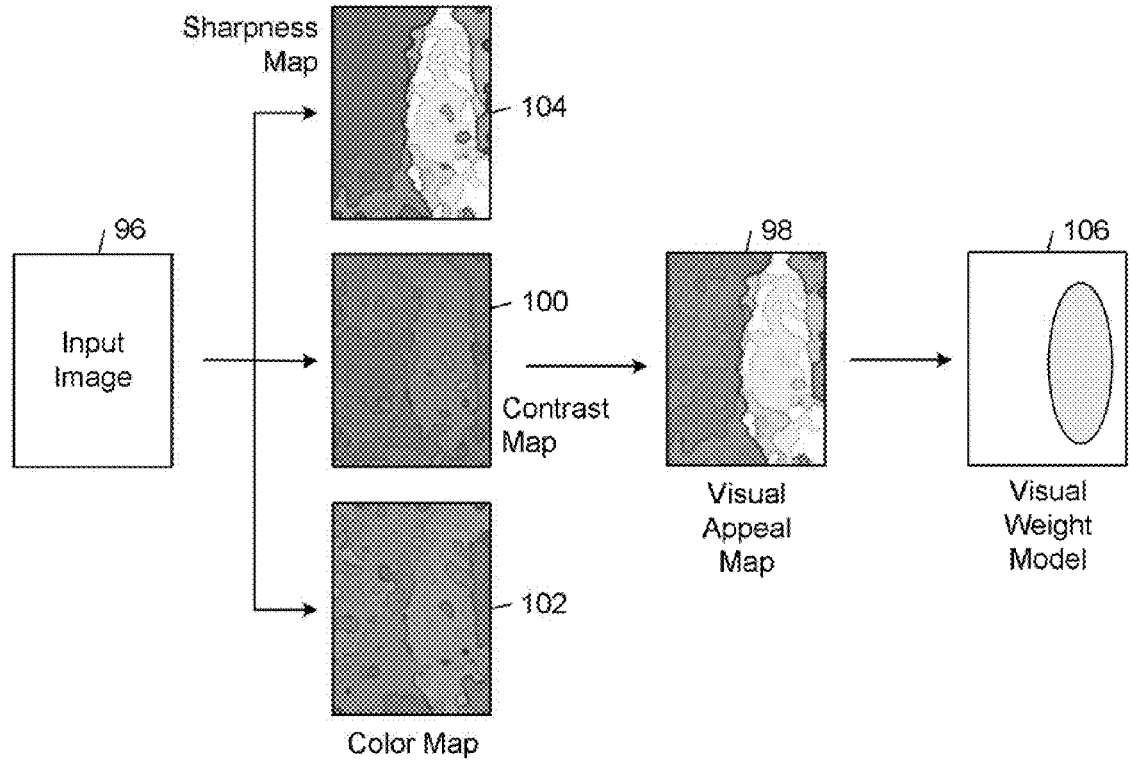
FIG. 7 is a diagrammatic view of various maps that are calculated in accordance with an embodiment of the method of FIG. 6.

FIG. 7 shows various maps that are calculated from an exemplary input image 96 in accordance with an embodiment of the method of FIG. 6. In the illustrated embodiment, a visual appeal map 98 is constructed from a contrast map 100, a color map 102, and a sharpness map 104. The contrast map 100 has values that correlate with the levels of contrast in the corresponding areas of the input image 96. The color map 102 has values that correlate with the levels of colorfulness in the corresponding areas of the input image 96. The sharpness map 104 has values that correlate with the levels of sharpness in the corresponding areas of the input image 96. The model 106 of visual weight in the input image 96 is constructed from the visual appeal map 98, as described in detail below.

b. Producing a Visual Appeal Map of an Image

Figure 8:
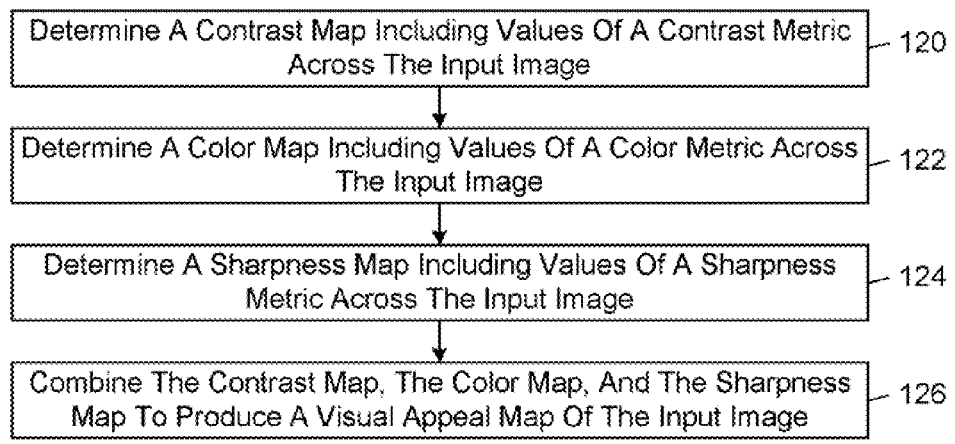
FIG. 8 is a flow diagram of an embodiment of a method of producing a visual appeal map of an image.

FIG. 8 is a flow diagram of an embodiment of a method of producing a visual appeal map of an image. In accordance with this method, the modeling engine 12 determines a contrast map that includes values of a contrast metric across the input image (FIG. 8, block 120). The modeling engine 12 determines a color map that includes values of a color metric across the input image (FIG. 8, block 122). The modeling engine 12 determines a sharpness map that includes values of a sharpness metric across the input image (FIG. 8, block 124). The modeling engine 12 combines the contrast map, the color map, and the sharpness map to produce a visual appeal map of the input image (FIG. 8, block 126).

i. Producing a Contrast Map of an Image

In general, the modeling engine 12 may determine the contrast map in any of a wide variety of different ways.

In some embodiments, the modeling engine 12 calculates a respective contrast value for each of the segmented regions of the input image in the contrast map in accordance with the image contrast quality scoring process described in U.S. Pat. No. 5,642,433.

In other embodiments, the modeling engine 12 calculates the respective contrast value for each image forming element location i in the contrast map by evaluating the measure of a root-mean-square contrast metric ($C_{RMS,i}$) defined in equation (1) for each segmented region $W_i$ in the input image.

$$C_{RMS,i} = \sqrt{\frac{1}{n_i - 1} \cdot \sum_{j \in W_i} (x_j - \bar{x}_i)^2} \qquad (1)$$

where $n_i$ is the number of image forming elements in the region $W_i$, $x_j$ is the normalized gray-level value of image forming element j in region $W_i$, $x_j$ has a value $0 \leq x_j \leq 1$, and $$\bar{x}_i = \frac{1}{n_i} \cdot \sum_{j \in W_i} x_j \qquad (2)$$

In some embodiments, the modeling engine 12 computes the contrast measures $\Omega_{r,contrast}$ for each region in the contrast map by evaluating the contrast measure defined in equation (3) for each corresponding region $W_i$ in the input image.

$$\Omega_{i,contrast} = \begin{matrix} 1 & \text{if } L_{r,\sigma} > 100 \\ 1 + L_{i,\sigma}/100 & \text{if } L_{r,\sigma} \geq 100 \end{matrix} \qquad (3)$$

where $L_{i,\sigma}$ is the respective variance of the luminance in the region $W_i$ in the input image.

ii. Producing a Color Map of an Image

In general, the modeling engine 12 may determine the colorfulness map in any of a wide variety of different ways. In some embodiments, the modeling engine 12 calculates the respective color value for each of the segmented regions i in the color map in accordance with the color metric defined in equation (4):

$$M_{i,c} = \sigma_{i,ab} + 0.37\mu_{i,ab} \quad (4)$$

In equation (4), the parameter $\sigma_{i,ab}$ is the trigonometric length of the standard deviation in the ab plane of the Lab color space representation of the segmented region i in the input image. The parameter $\mu_{i,ab}$ is the distance of the center of gravity in the ab plane to the neutral color axis in the Lab color space representation of the segmented region i in the input image.

iii. Producing a Sharpness Map of an Image (a) Overview

Figure 9:
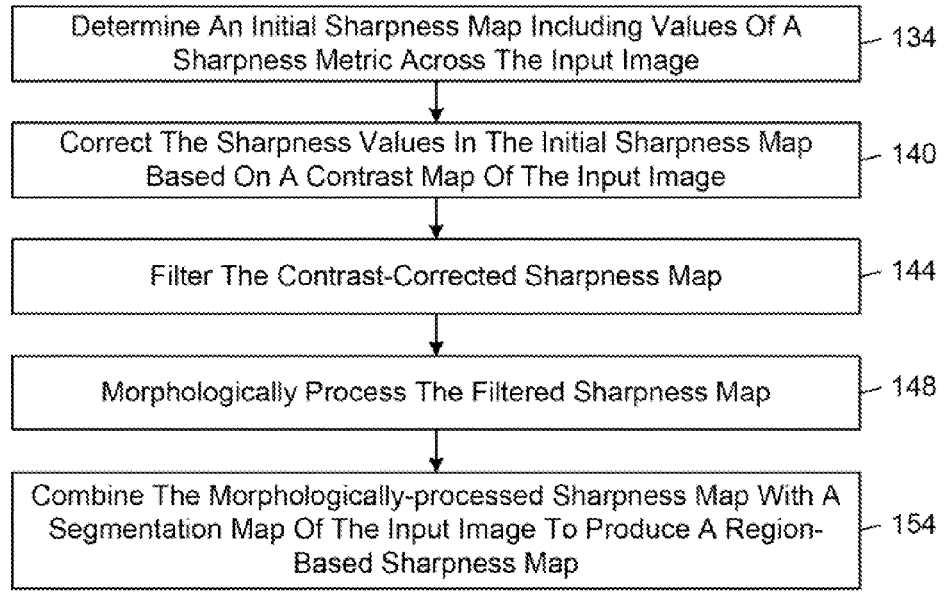
FIG. 9 is a flow diagram of an embodiment of a method of producing a sharpness map of an image.
Figure 10:
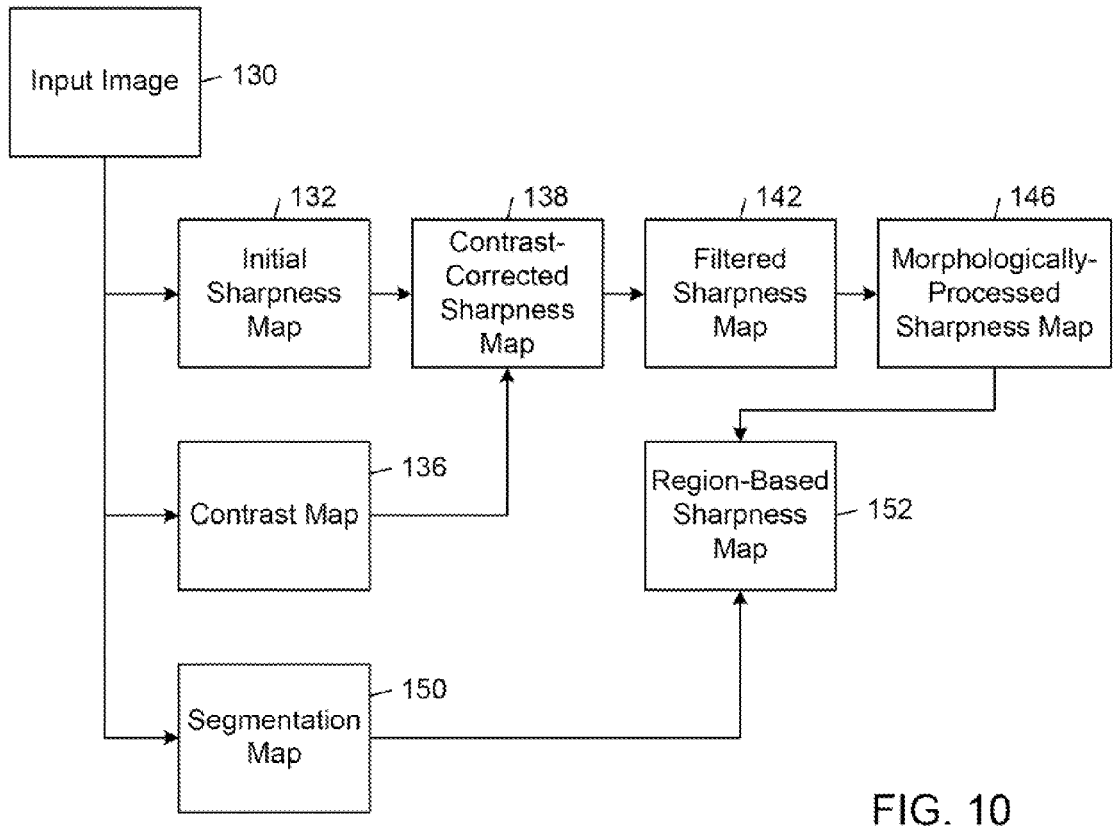
FIG. 10 is a diagrammatic view of various maps that are calculated in accordance with an embodiment of the method if FIG. 9.

FIG. 9 shows an embodiment of a method by which the modeling engine 12 produces a sharpness map of an input image 130. FIG. 10 shows the various maps that are calculated in accordance with the method of FIG. 9.

In accordance with the method of FIG. 9, the modeling engine 12 determines an initial sharpness map 132 that includes values of a sharpness metric across the input image 130 (FIG. 9, block 134). The modeling engine 12 corrects the sharpness values in the initial sharpness map 132 based on a contrast map 136 of the input image 130 to produce a contrast-corrected sharpness map 138 (FIG. 9, block 140). The modeling engine 12 filters the contrast-corrected sharpness map 138 to produce a filtered sharpness map 142 (FIG. 9, block 144). The modeling engine 12 morphologically processes the filtered sharpness map 142 to produce a morphologically-processed sharpness map 146 (FIG. 9, block 148). The modeling engine 12 combines the morphologically-processed sharpness map 146 with a segmentation map 150 of the input image 130 to produce a region-based sharpness map 152 (FIG. 9, block 154).

(b) Determining an Initial Sharpness Map (FIG. 9, Block 134)

The modeling engine 12 may determine the initial sharpness map 132 in any of a wide variety of different ways. In some embodiments, the modeling engine 12 determines the initial sharpness map 132 in accordance with a noise-robust sharpness estimation process. In an exemplary one of these embodiments, the modeling engine 12 computes a four-level Laplacian multiresolution pyramid from the input image 130 and combines the four resolution levels of the Laplacian pyramid to produce the initial sharpness map 132 with values that are resistant to high-frequency noise in the input image 130.

(c) Contrast-Correcting the Initial Sharpness Map (FIG. 9, Block 140)

The contrast map 136 that is used to correct the initial sharpness map 132 may be calculated in accordance with one of the contrast map calculation methods described above. In this process, the modeling engine 12 calculates a respective contrast map for each of three different sliding window sizes (e.g., 3×3, 7×7, and 11×11) and combines these multiresolution contrast maps to form the contrast map 136. In some embodiments, the modeling engine 12 combines the multiresolution contrast maps by selecting the maximum value of the contrast maps at each image forming location in the input image as the contrast value for the corresponding location in the contrast map 136. In some embodiments, the modeling engine 12 also performs a morphological dilation on the result of combining the three multiresolution contrast maps.

In one exemplary embodiment, the morphological dilation is performed with a dilation factor of 3.

The modeling engine 12 uses the contrast map 136 to correct the initial sharpness map 132. In this process, the modeling engine 12 reduces the sharpness values in areas of the sharpness map that correspond to areas of high contrast in the contrast map 136. In some embodiments, the modeling engine 12 multiplies the sharpness values by different sharpness factors depending on the corresponding contrast values. In some of these embodiments, the contrast-corrected sharpness values $S_{corrected}$ in the contrast-corrected sharpness map 138 are calculated from the initial sharpness values $S_{initial}$ based on the contrast value C at the corresponding image forming value location as follows:

If $C < \Phi$, $$\text{then, } S_{corrected} = S_{initial} \cdot (1 - \alpha \cdot (C - \Phi))$$

$$\text{else } S_{corrected} = S_{initial} \cdot \beta \cdot e^{-\gamma \cdot (C - \Phi)}$$

where $\Phi$ is an empirically determined contrast threshold value, and $\alpha$ and $\gamma$ are empirically determined parameter values. In one exemplary embodiment, $\Phi = 50$, $\alpha = 0.0042$, $\beta = 0.8$, and $\gamma = 0.024$. In some embodiments, the values of $S_{corrected}$ are truncated at 255.

(d) Filtering the Contrast-Corrected Sharpness Map (FIG. 9, Block 144)

The modeling engine 12 typically filters the contrast-corrected sharpness map 138 using an edge-preserving smoothing filter to produce a filtered sharpness map 142. This process further distinguishes the sharp regions from the blurred regions. In some embodiments, the modeling engine 12 filters the contrast-corrected sharpness map 138 with a bilateral Gaussian filter. In one exemplary embodiment, the bilateral Gaussian filter has a window size of 5×5 pixels, a closeness function standard deviation $\sigma_j = 10$, and a similarity function standard deviation $\sigma_s = 1$.

(e) Morphologically Processing the Filtered Sharpness Map (FIG. 9, Block 148)

The modeling engine 12 morphologically processes the filtered sharpness map 142 to produce a dense morphologically-processed sharpness map 146. In some embodiments, the modeling engine 12 sequentially performs the morphological operations of closing, opening, and erosion on the filtered sharpness map 142. In one exemplary embodiment, the modeling engine 12 performs these morphological operations with the following parameters: the closing operation is performed with a closing parameter of 7; the opening operation is performed with an opening parameter of 3; and the erosion operation is performed with an erosion parameter of 5.

(f) Producing the Region-Based Sharpness Map (FIG. 9, Block 154)

The modeling engine 12 combines the morphologically-processed sharpness map 146 with a segmentation map 150 of the input image 130 to produce a region-based sharpness map 152, which is calculated in accordance with the image segmentation process described above in §V (see FIG. 5). In this process, the modeling engine 12 assigns a sharpness value (sharpnessValue$_i$) to each of the regions i in the segmentation map 150 based on the sharpness values that are specified in the morphologically-processed sharpness map 146 for the region. The sharpness value that is assigned to a particular region of the region-based sharpness map 152 depends on a weighted accumulation of sharpness values of the image forming elements in the corresponding region of the morphologically-processed sharpness map 146. The weights depend on a multi-tiered thresholding of the sharpness values in the morphologically processed sharpness map 146, where higher sharpness values are weighted more than lower sharpness values to the accumulated sharpness value assigned to the region. The accumulated weighted sharpness value for each region is averaged over the number of image forming elements in the region that contributed to the accumulated value. In some embodiments, the modeling engine 12 also detects highly textured regions in the morphologically-processed sharpness map 146 and reduces the average accumulated weighted sharpness values in the detected highly textured regions.

iv. Producing a Visual Appeal Map from a Combination of the Contrast Map, the Color Map, and the Sharpness Map The modeling engine 12 combines the contrast map, the color map, and the sharpness map to produce a visual appeal map of the input image (see FIG. 15, block 126). The contrast map, the color map, and the sharpness map are combined in an additive fashion, since there may be areas with high frequency content (higher sharpness and contrast) but low colorfulness, and vice-versa, with low frequencies, but highly colorful. Both cases are captured in the scoring function described below. In some embodiments a respective value for each of the segmented regions i in the visual appeal map is calculated in accordance with the process defined in connection with equations (5) and (6).

If sharpnessDensity$_i$<sharpDensityThres then $$imageAppealMap_{j \in region_i} = finalSharpnessMap_i + \frac{colorful_i}{A + B \cdot sharpnessDensity_i} + \frac{contrast_i}{C + D \cdot sharpnessDensity_i} \quad (5)$$

Figure 11:
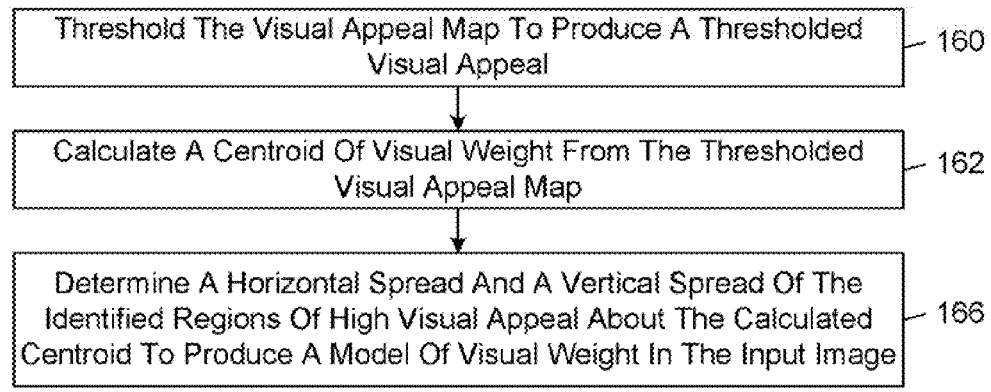
FIG. 11 is a flow diagram of an embodiment of a method of producing a model of visual weight in an image from a visual appeal map of the image.
Figure 12:
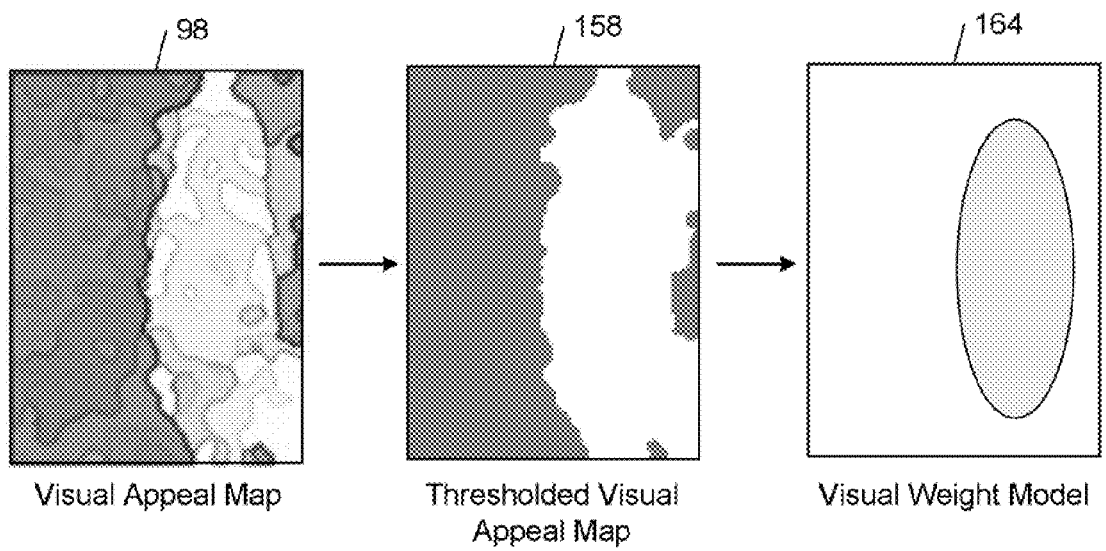
FIG. 12 is a diagrammatic view of various maps that are calculated in accordance with an embodiment of the method of FIG. 11.

If sharpnessDensity$_i$≧sharpDensityThres then $$imageAppealMap_{j \in region_i} = \quad (6)$$
$$finalSharpnessMap_i + \frac{1}{E}colorful_i + \frac{1}{F}contrast_i$$

where the parameters sharpDensityThres, A, B, C, D, E, and F have empirically determined values. In this process, the parameter sharpnessDensity is the percentage of area with sharp objects within a region. In some embodiments, the sharpnessDensity for each region i is calculated in accordance with equation (7).

$$sharpnessDensity_i = \quad (7)$$
$$\frac{1}{n_i} \cdot \sum_{j \in region_i} \begin{cases} 1, & \text{if } rawSharpnessMap_j > rawSharpnessThreshold \\ 0, & \text{if } rawSharpnessMap_j \le rawSharpnessThreshold \end{cases}$$

where rawSharpnessMap$_j$ is the sharpness value of the image forming element j in the region i.

v. Producing a Model of Visual Weight in an Image from a Visual Appeal Map of the Image FIG. 11 shows an embodiment of a method by which the modeling engine 12 produces a model of visual weight in an image from a visual appeal map of the image. FIG. 12 shows various maps that are calculated in accordance with an embodiment of the method of FIG. 11.

In accordance with the method of FIG. 1, the modeling engine 12 thresholds the visual appeal map 98 to produce a thresholded visual appeal map 158 (FIG. 11, block 160). In some embodiments, the modeling engine 12 thresholds the values in the visual appeal map 98 with a threshold that is set to 50% of the maximum value in the visual appeal map. In this process, the modeling engine 12 produce a binary visual appeal map 158 with values of 255 at image forming element locations where the values of the corresponding image forming elements in the visual appeal map 98 are above the threshold and values of 0 at the remaining image forming element locations.

The modeling engine 12 calculates a centroid of visual weight from the thresholded visual appeal map 158 (FIG. 11, block 162). In some embodiments, the modeling engine 12 calculates the image centroid by weighting the horizontal and vertical coordinates in the image with the visual appeal values A$_i$ associated with those coordinates.

$$x_{image-centroid} = 100 \cdot \frac{\sum_i x_i \cdot A_i}{D_{image-H} \cdot \sum_i A_i} \quad (8)$$

$$y_{image-centroid} = 100 \cdot \frac{\sum_i y_i \cdot A_i}{D_{image-V} \cdot \sum_i A_i} \quad (9)$$

where x$_i$ and y$_i$ are the x-coordinate and the y-coordinate of image forming element i in the image, A$_i$ is the visual appeal value of pixel i, and D$_{image-H}$ and D$_{image-V}$ are the horizontal and vertical dimensions of the image.

The modeling engine 12 determines a horizontal spread and a vertical spread of the identified regions of high visual appeal about the calculated centroid to produce a model 164 of visual weight in the input image (FIG. 11, block 166). In some embodiments, the horizontal and vertical spreads ($\sigma_{image-H}$, $\sigma_{image-V}$) correspond to the standard distributions of the visual appeal values Ai about the centroid along the horizontal and vertical dimensions of the image.

$$\sigma_{image-H} = \frac{100}{D_{image-H}} \cdot \sqrt{\frac{\sum_i^Z [(x_i - x_{image-centroid}) \cdot A_i]^2}{Z \cdot \sum_i^Z A_i^2}} \quad (10)$$

$$\sigma_{image-H} = \frac{100}{D_{image-V}} \cdot \sqrt{\frac{\sum_i^Z [(y_i - y_{image-centroid}) \cdot A_i]^2}{Z \cdot \sum_i^Z A_i^2}} \quad (11)$$

where Z is the number of image forming elements in the document.

The modeling engine 12 creates a respective index 18 from the parameters $\{x_{image-centroid}, y_{image-centroid}, \sigma_{image-H}, \sigma_{image-V}\}$ of each of the visual weight models and associates the respective index to the corresponding image. The modeling engine 12 may store the indices 18 in a database that is separate from the images 20 (as shown in FIG. 1) or it may store the indices with metadata that is associated with the corresponding ones of the images 20. The modeling engine 12 typically performs the visual weight modeling process as an offline process.

Other embodiments of the modeling engine 12 may produce a model of the visual weight distribution in an image from a visual appeal map of the image in ways that are different from the method described above. For example, in some embodiments, the modeling engine 12 may produce a model of image visual weight from a Gaussian mixture model approximation of the visual appeal map 98. In these embodiments, the parameters of the Gaussian mixture models may be used as the visual weight indices 18 for one or more of the images 20.

3. Producing a Model of Color in an Image

Figure 13:
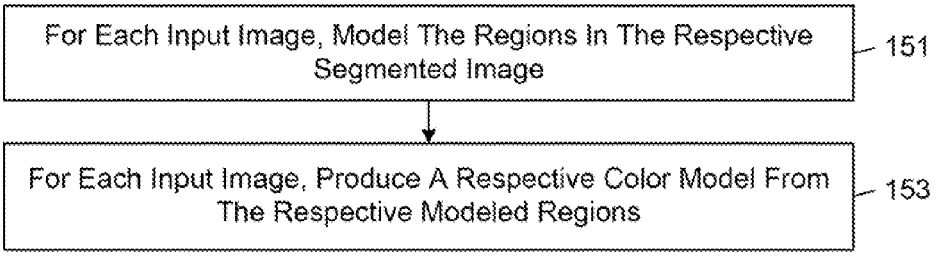
FIG. 13 is a flow diagram of an embodiment of a method of producing a model of color for an image.

FIG. 13 shows an embodiment of a method of producing a model of color for each of the images 20. In accordance with this method, the modeling engine 12 models the regions in the respective segmented image for each of the input images 20 (FIG. 13, block 151). In some embodiments, the respective segmented image is produced from the input image in accordance with the color segmentation process described above in § V (see FIG. 5). For each of the input images 20, the modeling engine 12 produces a respective color model from the respective modeled regions (FIG. 13, block 153).

Figure 14:
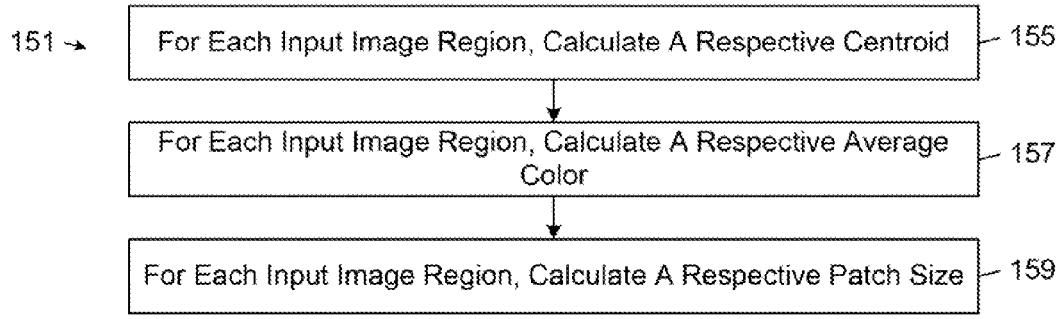
FIG. 14 is a flow diagram of an embodiment of a method by which the modeling engine 12 models the regions into which the input image is segmented

FIG. 14 shows an embodiment of a method by which the modeling engine 12 models the regions into which the input image is segmented (FIG. 13, block 151). In accordance with this method, the modeling engine 12 calculates for each region a respective centroid (FIG. 14, block 155), a respective average color (FIG. 14, block 157), and a respective patch size (FIG. 14, block 159). In some embodiments, the search engine 44 calculates the respective centroid of each region by weighting the horizontal and vertical coordinates in the region with the luminance values associated with those coordinates in accordance with equations (12) and (13).

$$x_{region-centroid} = 100 \cdot \frac{\sum_i x_i \cdot L_i}{D_{image-H} \cdot \sum_i L_i} \quad (12)$$

$$y_{region-centroid} = 100 \cdot \frac{\sum_i y_i \cdot L_i}{D_{image-V} \cdot \sum_i L_i} \quad (13)$$

In equations (12) and (13), $x_i$ and $y_i$ are the x-coordinate and the y-coordinate of image forming element i in the region, $D_{image-H}$ and $D_{image-V}$ are the image's horizontal and vertical dimensions, and $L_i$ is the luminance value of image forming element i. In accordance with equations (12) and (13), the search engine 44 calculates the respective centroid of each region as a percentage of the image's horizontal and vertical dimensions. In some exemplary embodiments, the patch size of a region is a count of the number of image forming elements in the region.

Figure 15:
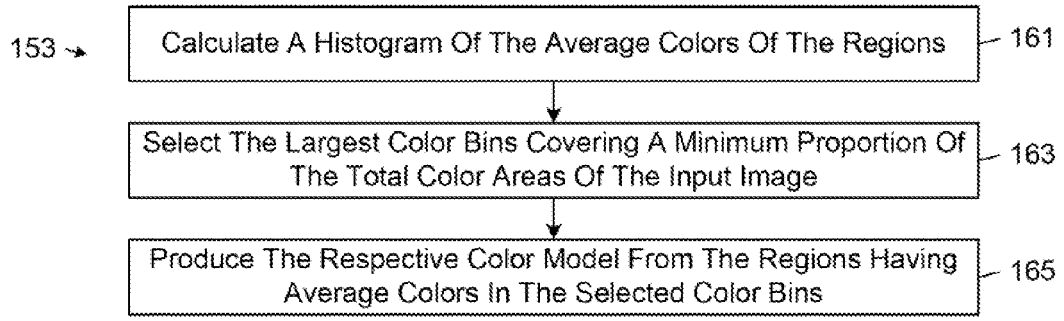
FIG. 15 is a flow diagram of an embodiment of a method by which the modeling engine 12 produces a respective color model from the respective regions that are modeled in the input image

FIG. 15 shows an embodiment of a method by which the modeling engine 12 produces a respective color model from the respective regions that are modeled in the input image (FIG. 13, block 153). In accordance with this method, the modeling engine 12 calculates a histogram of the average colors of the regions (FIG. 15, block 161). The modeling engine 12 selects the largest color bins covering a minimum proportion (e.g., 90%) of the total color areas (i.e., non-gray areas) of the input image (FIG. 15, block 163). The modeling engine 12 produces the respective color model from the regions having average colors in the selected color bins (FIG. 15, block 165).

Figure 16A:
FIG. 16A shows a segmented image that was produced from an exemplary input image in accordance with the color segmentation process of FIG. 5.
Figure 16B:
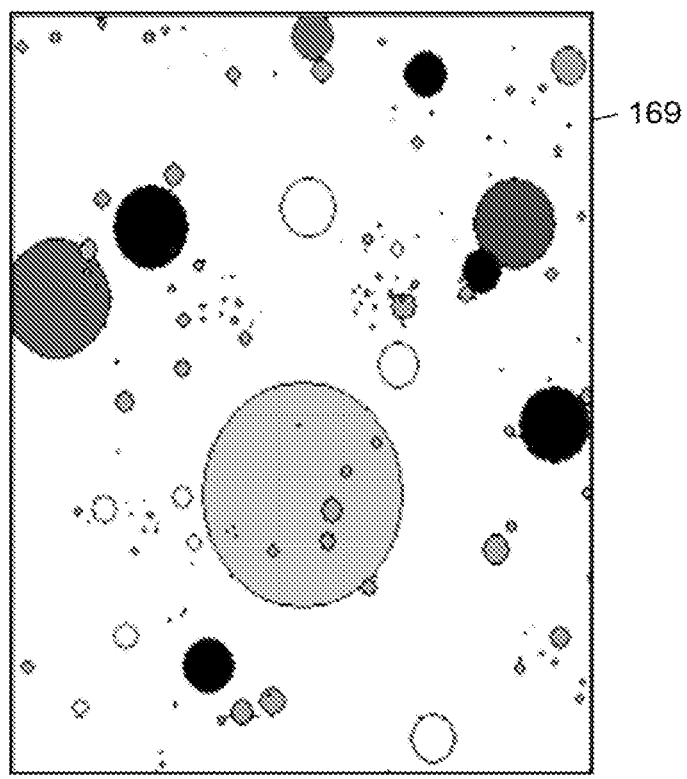
FIG. 16B shows a representation of a color model that was produced from the segmented image of FIG. 16B in accordance with the method of FIG. 13.

FIG. 16A shows a segmented image 167 that was produced from an exemplary input image in accordance with the color segmentation process described above in §V (see FIG. 5). FIG. 16B shows a representation of a color model 169 that was produced from the segmented image 167 in accordance with the method of FIG. 13. In FIG. 16B, the regions are modeled by circles having centers that coincide with the centroids of the corresponding regions in the segmented image 167 and having areas that encompass a number of image forming elements corresponding to the patch sizes of the corresponding regions.

Additional details regarding the operation and various implementations of the color modeling methods of FIGS. 13-15 are described in Pere Obrador, "Automatic color scheme picker for document templates based on image analysis and dual problem," in Proc. SPIE, vol. 6076, San Jose, Calif. (January 2006).

B. Generating Image Queries for Compositional Balance and Color Driven Content Retrieval 1. Overview As explained above, the search engine 14 generates an image query that is used to retrieve at least one of the images from a database based on comparisons of the image query with respective ones of the visual weight and color models of the images 20.

Figure 17:
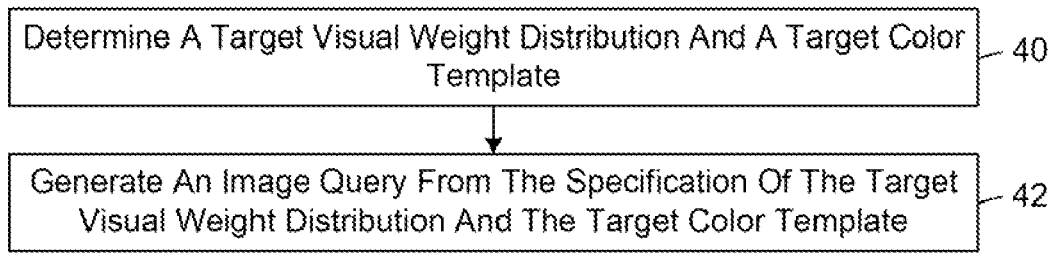
FIG. 17 is a flow diagram of an embodiment of a method of generating an image query.

FIG. 17 shows an embodiment of a method by which an embodiment of the search engine 14 generates a visual weight query. In accordance with this method, the search engine 14 determines a target visual weight distribution and a target color template (FIG. 17, block 40). The search engine 14 then generates an image query from the specification of the target visual weight distribution and the target color template (FIG. 17, block 42).

2. Document-Based Image Query Generation a. Overview

In some embodiments, the compositional balance and color driven content retrieval system 10 infers a visual weight model corresponding to the target visual weight distribution and a color model corresponding to a target color template automatically from an analysis of a document being constructed by the user and a specified compositional balance objective for the document.

Figure 18:
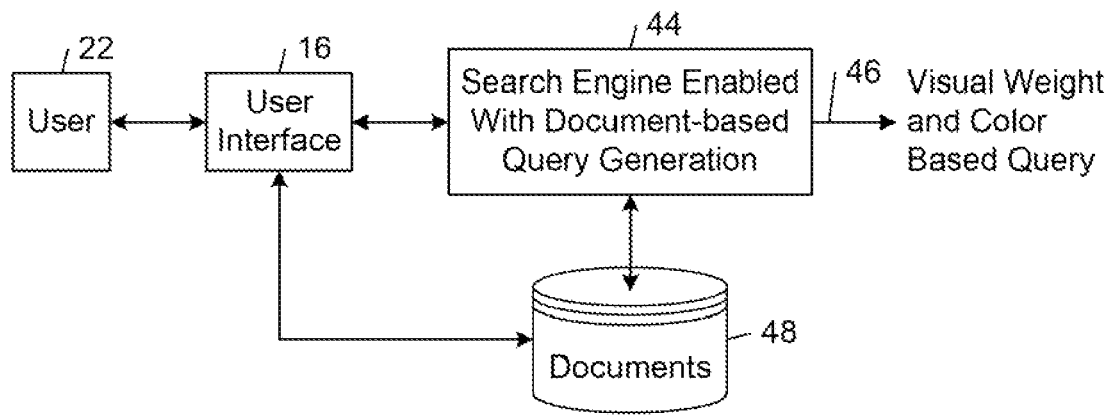
FIG. 18 is a block diagram of an embodiment of a system for generating an image query from a document.

FIG. 18 shows an embodiment 44 of the search engine 14 that generates a visual weight and color based query 46 from a document and a compositional balance objective that are specified by the user 22 through the user interface 16. The document typically is stored in a local or remote computer-readable storage device 48 that is accessible by the user interface 16 and the search engine 44.

This embodiment of the search engine 14 has particular applicability to an application environment in which the user 22 is constructing a document and wishes to incorporate in the document an image that balances the other objects in the document in a way that achieves a particular compositional balance objective and that has colors that achieve a specified color harmony objective (e.g., affine, complementary, split complementary, triadic). In this case, the search engine 44 determines a model of the current visual weight distribution in the document and a model of the color in the document. The search engine 44 uses the visual weight and color models of the document to form an image query that targets images having visual weight distributions and colors that complement current state of the document in ways that meet the user's compositional balance and color objectives.

b. Constructing a Target Visual Weight Distribution from a Document

Figure 19:
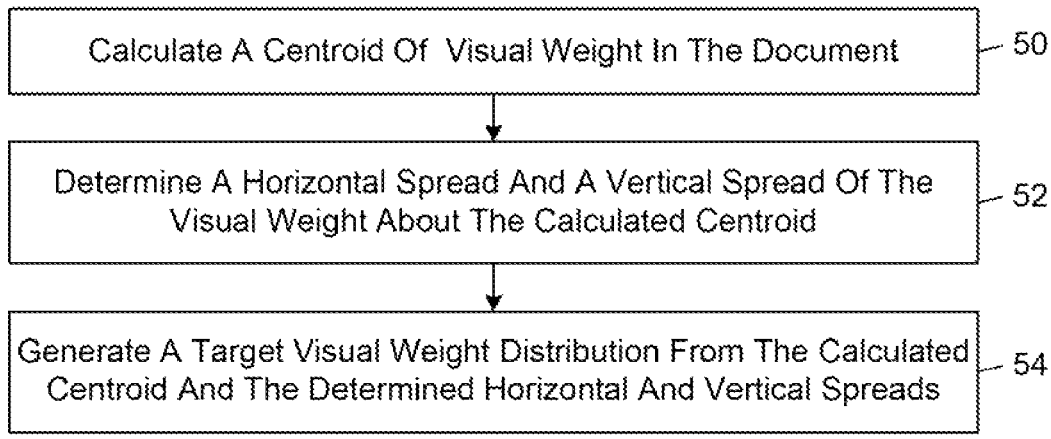
FIG. 19 is a flow diagram of an embodiment of a method of generating a target visual weight distribution from a document.

FIG. 19 shows an embodiment of a method by which the search engine 44 generates a target visual weight distribution from a model of the visual weight distribution in a document. In accordance with this method, the search engine 44 calculates a centroid of visual weight in the document (FIG. 19, block 50). The search engine 44 determines a horizontal spread and a vertical spread of the visual weight about the calculated centroid (FIG. 19, block 52). The search engine 44 generates a target visual weight distribution from the calculated centroid and the determined horizontal and vertical spreads (FIG. 19, block 54).

FIGS. 20-22 show an illustration of the operation of the search engine 44 in accordance with the method of FIG. 19 in the specific context of an exemplary document and an exemplary compositional balance objective that are specified by the user 22.

FIG. 20 shows an example of a document 56 that has a plurality of objects 58-70 that are arranged in a current compositional layout. In this example, the user 22 wants to insert an image in the area demarcated by the dashed circle 72. Through the user interface 16, the user 22 submits to the search engine 44 a request for a set of one or more images that have respective visual weight distributions that complement the current visual weight distribution in the document 56 to achieve a composition that has a left-right symmetrical balance.

In response to the user's request, the search engine 44 calculates a centroid of visual weight in the document (FIG. 19, block 50). In some embodiments, the search engine 44 calculates the document centroid ($x_{doc\text{-}centroid}$, $y_{doc\text{-}centroid}$) as a percentage of the document's horizontal and vertical dimensions ($D_{doc\text{-}H}$, $D_{doc\text{-}V}$) in accordance with equations (14) and (15):

$$x_{doc\text{-}centroid} = 100 \cdot \frac{\sum_j x_j \cdot E_j}{D_{doc\text{-}H} \cdot \sum_j E_j} \quad (14)$$

$$y_{doc\text{-}centroid} = 100 \cdot \frac{\sum_j y_j \cdot E_j}{D_{doc\text{-}V} \cdot \sum_j E_j} \quad (15)$$

where ($x_j, y_j$) are the coordinates of the centroid of object j, and $E_j$ is the number of image forming elements (e.g., pixels) in object j. In some embodiments, the search engine 44 calculates the document centroid by weighting the horizontal and vertical coordinates in the document with the luminance values associated with those coordinates in accordance with equations (16) and (17).

$$x_{doc\text{-}centroid} = 100 \cdot \frac{\sum_i x_i \cdot L_i}{D_{doc\text{-}H} \cdot \sum_i L_i} \quad (16)$$

$$y_{doc\text{-}centroid} = 100 \cdot \frac{\sum_i y_i \cdot L_i}{D_{doc\text{-}V} \cdot \sum_i L_i} \quad (17)$$

In these equations, $x_i$ and $y_i$ are the x-coordinate and the y-coordinate of image forming element i in the document and $L_i$ is the luminance value of image forming element i.

The search engine 44 also determines a horizontal spread and a vertical spread of the visual weight about the calculated centroid (FIG. 19, block 52). In some embodiments, the horizontal and vertical spreads ($\sigma_{doc\text{-}H}$, $\sigma_{doc\text{-}V}$) correspond to the standard deviations of the luminance values about the centroid along the horizontal and vertical dimensions of the document expressed as percentages of the document's horizontal and vertical dimensions.

$$\sigma_{doc\text{-}H} = \frac{100}{D_{doc\text{-}H}} \cdot \sqrt{\frac{\sum_i^K [(x_i - x_{doc\text{-}centroid}) \cdot L_i]^2}{K \cdot \sum_i^K L_i^2}} \quad (18)$$

$$\sigma_{doc\text{-}H} = \frac{100}{D_{doc\text{-}V}} \cdot \sqrt{\frac{\sum_i^K [(y_i - y_{doc\text{-}centroid}) \cdot L_i]^2}{K \cdot \sum_i^K L_i^2}} \quad (19)$$

where K is the number of image forming elements in the document.

FIG. 21 shows an embodiment of a model 74 of visual weight in the document 56 (see FIG. 20). In this embodiment, the visual weight model is an ellipse that has a centroid coincident with the center of visual weight in the document 56 (i.e., the calculated centroid location ($x_{doc\text{-}centroid}$, $y_{doc\text{-}centroid}$)) and horizontal and vertical dimensions equal to the horizontal spread and a vertical spread of the visual weight about the calculated centroid (i.e., $\sigma_{doc\text{-}H}$ and $\sigma_{doc\text{-}V}$) In other embodiments, the visual weight in the document may be modeled by a different shape, including but not limited to, for example, a rectangle, a circle, and a square.

The search engine 44 generates a target visual weight distribution from the calculated centroid ($x_{doc\text{-}centroid}$, $y_{doc\text{-}centroid}$) and the determined horizontal and vertical spreads ($\sigma_{doc\text{-}H}$, $\sigma_{doc\text{-}V}$) (FIG. 19, block 54). In this process, the search engine 44 geometrically transforms the model of visual weight in the document in accordance with the compositional balance objective, and produces the target visual weight distribution from attributes of the geometrically transformed visual weight model.

For example, if the compositional balance objective is left-right symmetrical balance, the search engine 44 transforms the visual weight model by reflecting the model about an axis parallel to a vertical dimension of the document and extending through a central point (e.g., the visual center) in the document, as suggested by the arrow 77 in FIG. 22. In some embodiments, the search engine 44 transforms the visual weight model by re-computing the horizontal coordinate of the document centroid about the central vertical axis 76 (see FIG. 22) in accordance with equation (20):

$$x_{query\text{-}centroid} = 100 - x_{doc\text{-}centroid} \quad (20)$$

The vertical coordinate of the document centroid and the horizontal and vertical visual weight spreads are unchanged. That is, $$y_{query\text{-}centroid} = y_{doc\text{-}centroid} \quad (21)$$

$$\sigma_{query\text{-}H} = \sigma_{doc\text{-}H} \quad (22)$$

$$\sigma_{query\text{-}V} = \sigma_{doc\text{-}V} \quad (23)$$

If the compositional balance objective is centered balance, the search engine 44 transforms the visual weight model by reflecting the model about an axis inclined with respect to horizontal and vertical dimensions of the document and extending through a central point (e.g., the visual center) in the document. In some embodiments, the search engine 44 transforms the visual weight model by re-computing the horizontal and vertical coordinates of the document centroid in accordance with equations (24) and (25):

$$x_{query\text{-}centroid} = 100 - x_{doc\text{-}centroid} \quad (24)$$

$$y_{query\text{-}centroid} = 100 - y_{doc\text{-}centroid} \quad (25)$$

The search engine 44 constructs the target visual weight distribution from the target visual weight distribution parameters $\{x_{query\text{-}centroid}, y_{query\text{-}centroid}, \sigma_{query\text{-}H}, \sigma_{query\text{-}V}\}$. In some embodiments, these parameters are incorporated into an SQL implementation of the image query.

b. Constructing a Target Color Template from a Document

Figure 23:
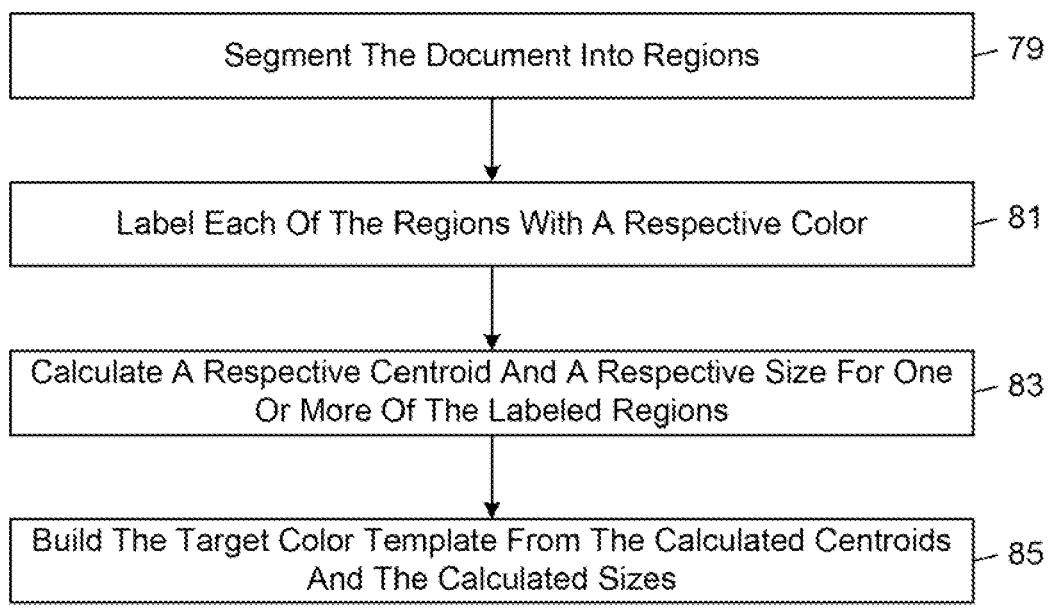
FIG. 23 is a flow diagram of an embodiment of a method of constructing the target color template from a document.
Figure 24A:
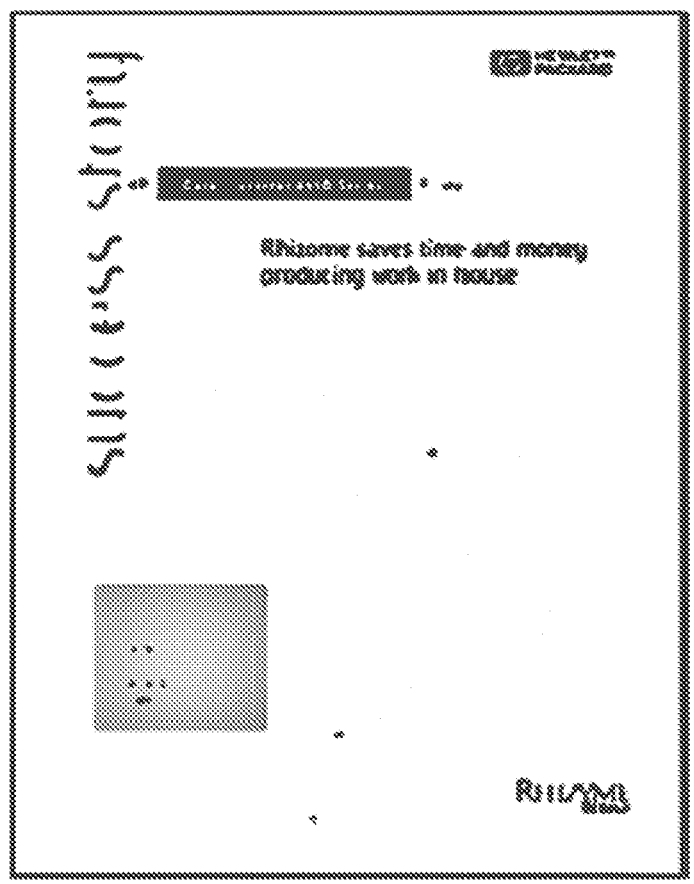
FIGS. 24A-24C show different color maps that are produced from the document of FIG. 20 in accordance with the method of FIG. 23.
Figure 24B:
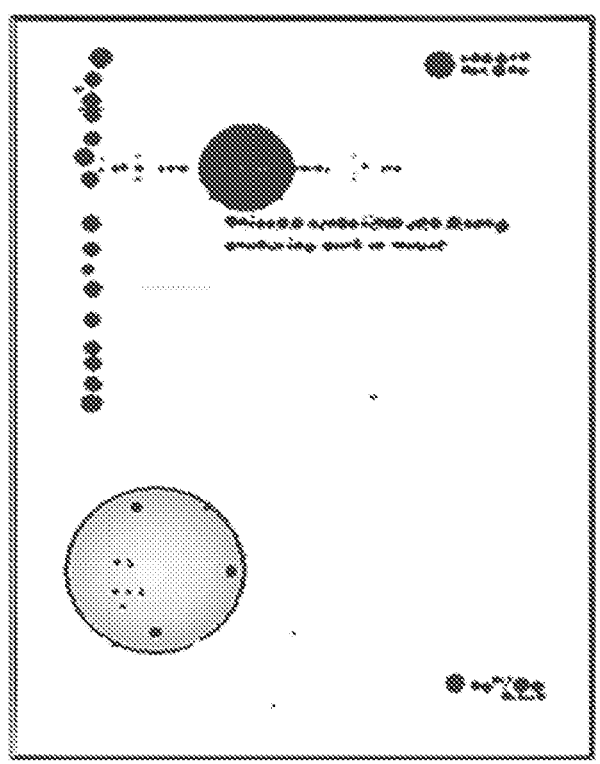
Figure 24C:
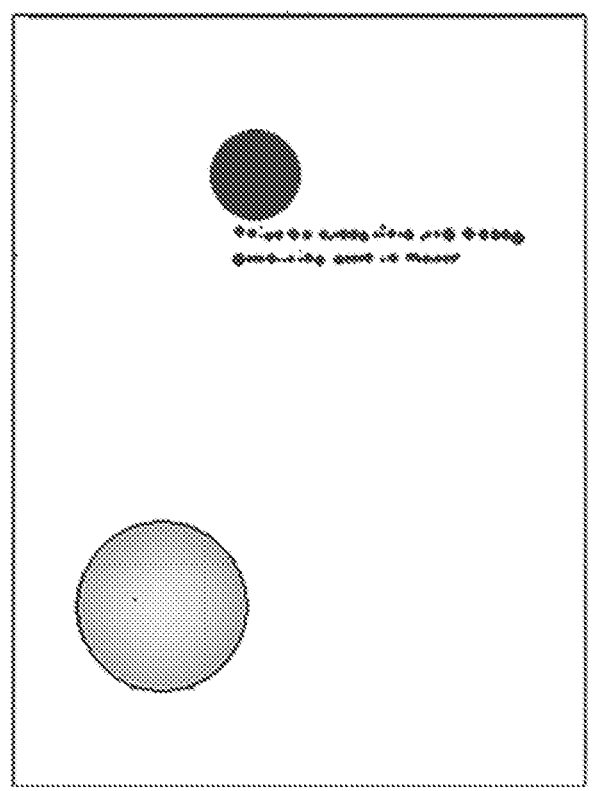

FIG. 23 shows an embodiment of a method of constructing the target color template from a document. FIGS. 24A-24C show different color maps that are produced from the document 56 in accordance with the method of FIG. 23.

In accordance with this method, the search engine 44 segments the document into regions (FIG. 23, block 79). In some embodiments, the search engine 44 processes the document in accordance with the color segmentation process described above in § V (see FIG. 5) to segment the document into regions. FIG. 24A shows a segmentation map that was produced from the document 56 (see FIG. 20) in accordance with the color segmentation process of FIG. 5.

The search engine 44 labels each of the regions with a respective color (FIG. 23, block 81). In some embodiments, the search engine 44 labels the regions with an average of the lexical color names assigned to the constituent image forming elements based on the quantization table used to segment the document into regions (see §V above).

The search engine 44 calculates a respective centroid and a respective size for one or more of the labeled regions (FIG. 23, block 83). In some embodiments, the search engine 44 calculates the region centroids in accordance with the method of FIG. 14 (see equations (12) and (13)). In some embodiments the region size is a count of the number of image forming elements in the region. FIG. 24B shows a representation of a color model that was produced from the segmented image of FIG. 24A, where the regions are modeled by circles having centers that coincide with the centroids of the corresponding regions in the segmented image and having areas that encompass a number of image forming elements corresponding to the patch sizes of the corresponding regions.

The search engine 44 builds the target color template from the calculated centroids and the calculated sizes (FIG. 23, block 85). In some embodiments, the search engine 44 builds the target color template from the color model parameters $\{x_{doc\text{-}centroid, region\text{-}k}, y_{doc\_centroid,region\text{-}k}, Size_{region\text{-}k}, Color_{ave\text{-}region\text{-}k}\} \forall regions_k$. In some embodiments, these parameters are incorporated into a structured query language (SQL) implementation of the image query. FIG. 24C shows a representation of a color model that was produced from the color model of FIG. 24B in accordance with the method of FIG. 15.

3. Manual Image Query Generation

In some embodiments, the compositional balance and color driven content retrieval system 10 receives from the user interface 16 a direct specification by the user 22 of the desired visual weight and color palette in the images to be retrieved by the system 10.

Figure 25A:
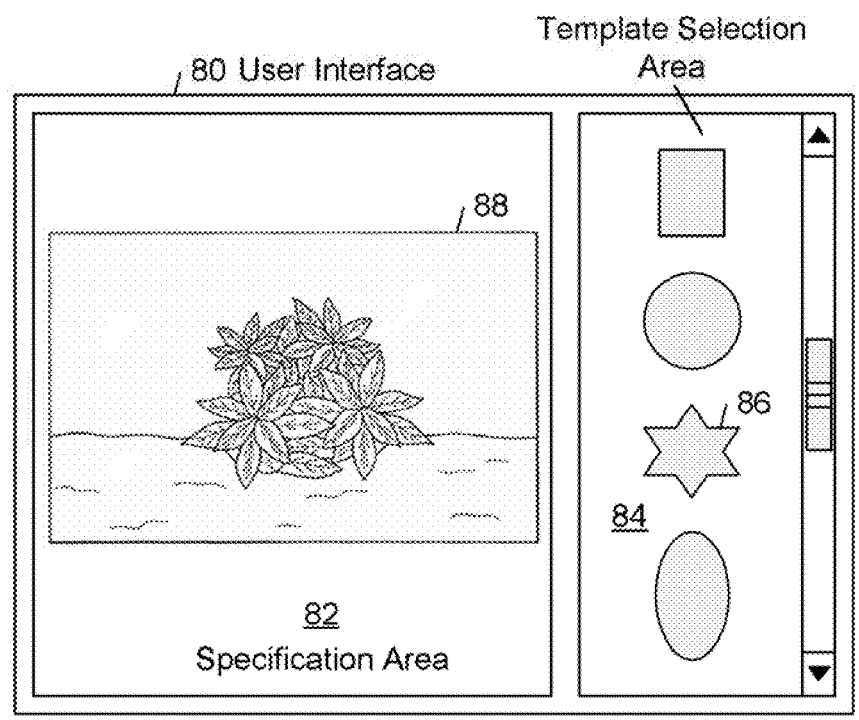
FIGS. 25A and 25B are diagrammatic views of an embodiment of a user interface for specifying a visual weight distribution.
Figure 25B:
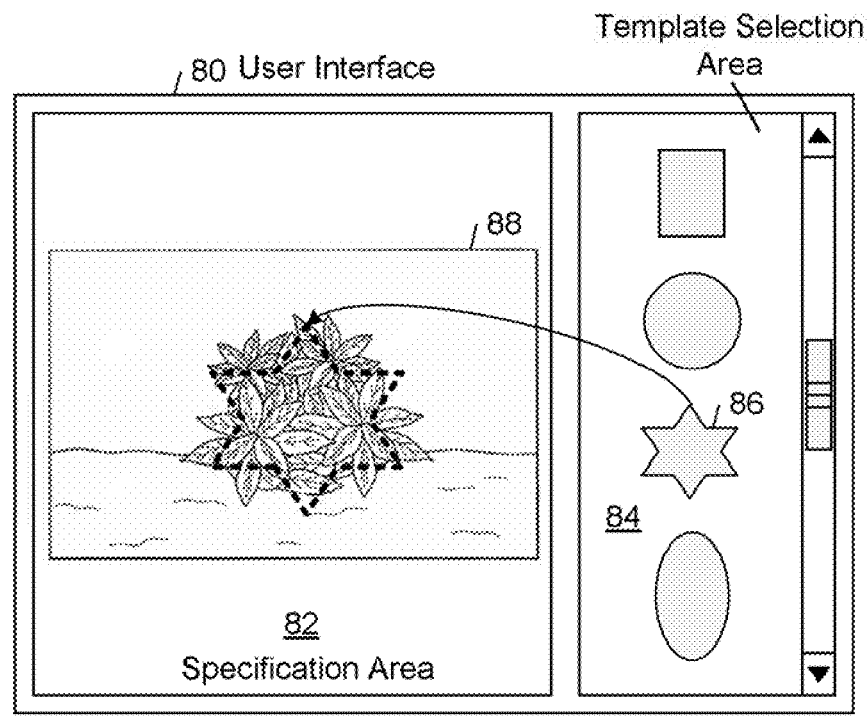

FIGS. 25A and 25B show a diagrammatic view of an embodiment 80 of the user interface 16 that allows the user 22 to specify a target visual weight distribution and color palette for the images that the user would like the search engine 14 to retrieve. The user interface 80 includes a specification area 82 and a template selection area 84.

The user 22 can specify the target visual weight distribution by dragging a template (e.g., the star template 86) from the template selection area 84 into the specification area 82 and scaling the selected template to match the user's conception of the target visual weight distribution. In the illustrated embodiment, the specification area 82 is configured to allow the user 22 to view an image 88, as shown in FIG. 25A. The user may use the displayed image 88 as a guide for selecting and scaling the selected template to conform to a target visual weight distribution matching the perceived visual weight distribution in the image 88, as shown in FIG. 25B. The final shape, size, and location of the template correspond to the shape, size, and location of the target visual weight distribution. In some embodiments, the user interface 80 includes drawing tools that allow the user 22 to simply draw the shape of the target visual weight distribution with respect to a designated compositional area presented in the specification area 82. After the user 22 has completed the specification of the graphical representation of the target visual weight distribution, the search engine 14 extracts parameters that define the shape, size, and location of that graphical representation and incorporates the extracted parameters into an image query.

The user 22 can specify the target color template by selecting an image (e.g., image 88) that contains a color palette and color distribution that the user 22 would like to see in the images retrieved by the search engine 14 (e.g., the selected image contains a color palette that meets the user's color harmonization objective). Alternatively, the user 22 may specify the target color template directly by arranging colors on a virtual canvass, where the colors are selected from a virtual color wheel or the like that is part of an automated color harmonization software application package. After the user 22 has completed the specification of the target color template, the search engine 14 extracts parameters that define the target color template and incorporates the extracted parameters into an image query.

C. Retrieving Image Content a. Overview

As explained above, the compositional balance and color driven content retrieval system 10 retrieves at least one of the images 20 from a database based on a respective score that is calculated for each of the images from the image query, the respective visual weight model, and the respective color model (see FIG. 2, blocks 26 and 28). In this process, the search engine 14 compares the image query to the indices 18 and returns to the user interface 16 ones of the indices 18 that are determined to match the image queries. The search engine 14 ranks the indices 18 based on a scoring function that produces values indicative of the level of match between the image query and the respective indices 18, which define the respective models of visual weight in the images 20.

b. Determining a Respective Visual Weight Comparison Value for Each Image

In some embodiments, the search engine 14 calculates for each image i in the collection of image 20 a visual weight comparison function that decreases with increasing spatial distance between the image query and the respective model of visual weight in the image. In some of these embodiments, the visual weight comparison function varies inversely with respect to the distance between the centroid specified in the image query and the centroid of the image visual weight model and varies inversely with respect to the respective distance between the horizontal and vertical spreads specified in the image query and the horizontal and vertical spreads of the image visual weight model. Equation (26) defines an exemplary visual weight comparison function of this type:

$$VisualWeightScore_i = \frac{1}{1 + f(\Delta_{centroid,i}) + g(\Delta_{spread,i})} \quad (26)$$

where $\Delta_{centroid,i}$ measures the distance between the centroid specified in the image query and the centroid of the visual weight model of image i, f( ) is a monotonically increasing function of $\Delta_{centroid,i}$, $\Delta_{spread,i}$ measures the distance between the horizontal and vertical spreads specified in the image query and the horizontal and vertical spreads of the visual weight model of image i, and g( ) is a monotonically increasing function of $\Delta_{spread}$. In some embodiments, $\Delta_{centroid,i}$ and $\Delta_{spread,i}$ are defined in equations (27) and (28):

$$\Delta_{centroid,i} = \sqrt{(x_{image\ i\text{-}centroid} - x_{query\text{-}centroid})^2 + (y_{image\ i\text{-}centroid} - y_{query\text{-}centroid})^2} \quad (27)$$

$$\Delta_{spread,i} = \sqrt{(\sigma_{image\ i\text{-}H} - \sigma_{query\text{-}H})^2 + (\sigma_{image\ i\text{-}V} - \sigma_{query\text{-}V})^2} \quad (28)$$

In some embodiments, $f(\Delta_{centroid,i})$ is given by:

$$f(\Delta_{centroid,i}) = \lambda \cdot \Delta_{centroid,i}^{\epsilon} \quad (29)$$

where $\lambda$ and $\epsilon$ are empirically determined constants. In some exemplary embodiments, $1 \leq \lambda \leq 5$ and $\epsilon = 2$. In some embodiments, $g(\Delta_{spread,i})$ is given by:

$$g(\Delta_{spread,i}) = \omega \cdot \Delta_{spread,i}^{\psi} \quad (30)$$

where $\omega$ and $\psi$ are empirically determined constants. In some exemplary embodiments, $1 \leq \omega \leq 5$ and $1 \leq \psi \leq 2$.

In some embodiments the visual weight comparison function defined in equation (26) may be scaled by a default or user-selected measure of visual appeal in accordance with equation (31).

$$VisualWeightScore_i = \frac{Q(M_{i,j})}{1 + f(\Delta_{centroid,i}) + g(\Delta_{spread,i})} \quad (31)$$

where $Q(M_{i,j})$ is a quality function of $M_{i,j}$, which is a quality map j of image i. The quality map $M_{i,j}$ may correspond to any of the maps described herein, including but not limited to the visual appeal map, the sharpness map, the contrast map, and the color map. In some embodiments, $Q(M_{i,j})$ is a two-dimensional integral of the quality map $M_{i,j}$.

c. Determining a Respective Color Comparison Value for Each Image

In some embodiments, the search engine 14 an image-based color comparison function (ColorScore$_i$) for each image i in the collection of the images 20. The color comparison function is based on a region-based color comparison function that compares each of the regions u in the target color template with each of the regions v in the color model determined for each of the images 20. In some embodiments, the color comparison function decreases with increasing spatial distance between the regions in the target color template and the regions in the image color model, decreases with increasing Euclidean distance between the regions in the target color template and the regions in the image color model in a color space (typically the CIE Lab color space), and increases with the sizes of the target template regions and the image color model region. Equation (32) defines an exemplary region-based color comparison function of this type:

$$ColorComp_{uv,i} = \frac{s(Size_u, Size_v)}{a(\Delta_{centroid,uv}) \cdot b(\Delta_{color,uv})} \quad (32)$$

Figure 26:
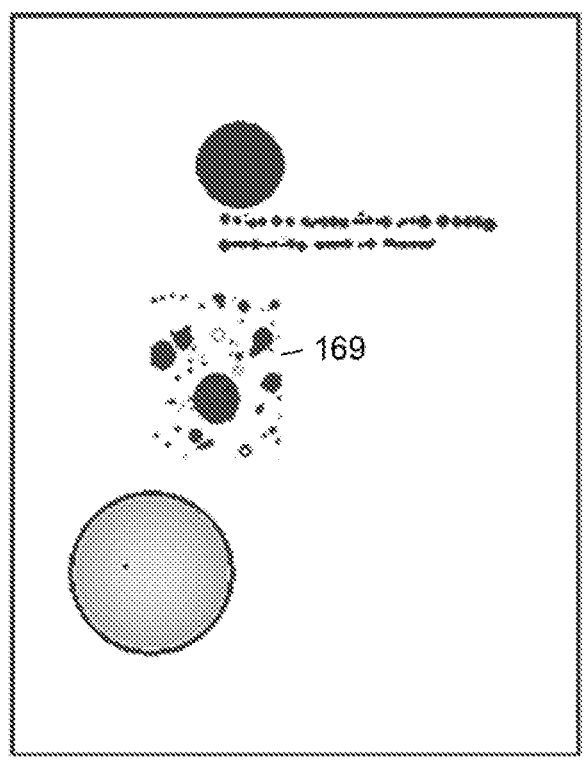
FIG. 26 is a diagrammatic view of the image color model of FIG. 16B positioned in a specific document location in relation to the document color model of FIG. 24C.

In equation (27), s( ) is a function of the size (Size$_u$) of the target color template region u and the size (Size$_v$) of the image color model region v of image i, a( ) is a function of $\Delta_{centroid,uv}$, which measures the spatial distance between the centroid of the target color template region u and the centroid of the image color model region v, and b( ) is a function of $\Delta_{color,uv}$, which measures the Euclidean color space distance between the centroid of the target color template region u and the centroid of the image color model region v of image i. In some embodiments, $\Delta_{centroid,uv}$ is calculated in accordance with equation (33):

$$\Delta_{centroid,uv} = \frac{}{\sqrt{(centroidX_u - centroidX_v)^2 + (centroidY_u - centroidY_v)^2}} \quad (33)$$

where (centroidX$_u$,centroidY$_v$) is the centroid location of the target color template region u and (centroidX$_u$,centroidY$_v$) is the centroid location of the image color model region v. For image queries that are designed to retrieve images that the user intends to insert into a document, $\Delta_{centroid,uv}$ measures the spatial distance between the target color template region u and the color model region v for the candidate image positioned in a designated target location in the document, as shown in FIG. 26 where the image color model 169 (see FIG. 16B) is inserted into the color model of FIG. 24C that was produced for document 56 (see FIG. 20). In some embodiments, $\Delta_{color,uv}$ is calculated in accordance with equation (34):

$$\Delta_{color,uv} = \frac{}{\sqrt{(aveL_u - aveL_v)^2 + (aveA_u - aveA_v)^2 + (aveB_u - aveB_v)^2}} \quad (34)$$

where (aveL$_u$,aveA$_u$,aveB$_u$) is the average L, a, and b color values of the target color template region u and (aveL$_v$,aveA$_v$, aveB$_v$) is the average L, a, and b color values of the image color model region v of image i.

In some of these embodiments, s( ) is given by equation (35), a( ) is given by equation (36), and b( ) is given by equation (37):

$$s(Size_u, Size_v) = (Size_u \times Size_v)^R \quad (35)$$

$$a(\Delta_{centroid,uv}) = S + T \cdot (\Delta_{centroid,uv})^W \quad (36)$$

$$b(\Delta_{color,uv}) = H + L \cdot (\Delta_{color,uv})^M \quad (37)$$

where R, T, T, W, H, L, and M have empirically determined constant values. In one exemplary embodiment, R=0.5, S=T=W=H=L=1, and M=4.

In some embodiments, the image-based color comparison function (ColorScore$_i$) is calculated from the region-based color comparison function (ColorComp$_{uv,i}$) for each image i in the collection of images 20 in accordance with equation (38):

$$ColorScore_i = \sum_{u \in document} \sum_{v \in image\ i} ColorComp_{uv,i} \qquad (38)$$

d. Determining a Respective Score for Each Image

In some embodiments, the search engine 14 calculates the respective score (ImageScore$_i$) from an evaluation of a joint scoring function that involves a multiplication together of the respective visual weight comparison value (VisualWeightScore$_i$) and the respective color comparison value (ColorScore$_i$), as defined in equation (39).

$$ImageScore_i = \phi(VisualWeightScore_i) \cdot \theta(ColorScore_i) \qquad (39)$$

where $\phi(\ )$ is a function of visual weight comparison value (VisualWeightScore$_i$) that was computed for image i and $\theta(\ )$ is a function of the color comparison value (ColorScore$_i$) that was computed for image i.

In some embodiments, the functions $\phi(\ )$ and $\theta(\ )$ are given by equations (40) and (41):

$$\phi(VisualWeightScore_i) = \chi + \mu \cdot (VisualWeightScore_i)^\nu \qquad (40)$$

$$\theta(ColorScore_i) = \rho + \varsigma (VisualWeightScore_i)^\tau \qquad (41)$$

where $\chi$, $\mu$, $\nu$, $\rho$, $\varsigma$, and $\tau$ are empirically determined constants. In one exemplary embodiment, $\chi = \rho = 0$, $\mu = \varsigma = 1$, $\nu = 2$, and $\tau = 1$. In another exemplary embodiment, $\chi = \rho = 0$, $\mu = \varsigma = 1$, $\nu = 1$, and $\tau = 0.5$.

The search engine 14 identifies one or more of the images 20 that have greatest likelihood of matching the image query based on the respective ImageScores$_i$ and retrieves the one or more identified images.

In some embodiments, before ranking the images 20 in terms of their likelihoods of matching the image query, the search engine 14 adjusts the respective ImageScores$_i$ to reduce likelihoods of matching the image query to ones of the images 20 having respective scores that meet a high likelihood of match predicate and respective visual weight comparison values that meet a low likelihood of visual weight match predicate. For example, in some exemplary embodiments, the search engine reduces the ImageScore$_i$, if the following conditions are met:

$$ImageScore_i > highMatchThreshold \qquad (42)$$

$$\phi(VisualWeightScore_i) < \omega_{LVWMS} \qquad (43)$$

where $\omega_{LVWMS}$ is the lowVisualMatchThreshold, and highMatchThreshold and $\omega_{LVWMS}$ have empirically determined constant values. In these embodiments, the search engine 14 also adjusting the respective scores to reduce likelihoods of matching the image query to ones of the images 20 having respective scores that meet the high likelihood of match predicate and respective color comparison values that meet a low likelihood of color match predicate. For example, in some exemplary embodiments, the search engine also reduces the ImageScore$_i$, if the following conditions are met:

$$ImageScore_i > highMatchThreshold \qquad (44)$$

$$\theta(ColorScore_i) < \omega_{LCMS} \qquad (45)$$

where $\omega_{LCMS}$ is the lowColorMatchThreshold and has an empirically determined constant value.

Figure 27:
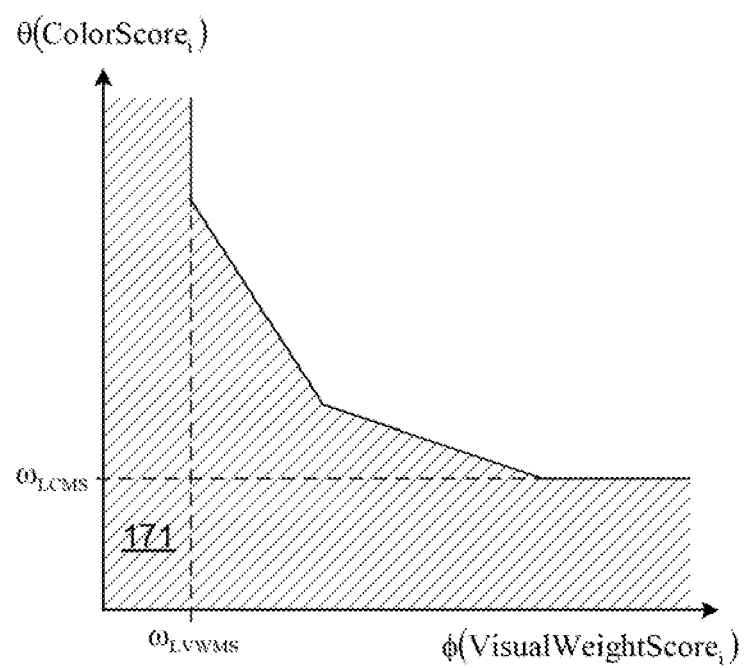
FIG. 27 is a graph illustrating threshold values that are used to adjust the image scores for extreme images in which either the visual weight quality or the color quality is below an empirically determined acceptable level.

In some of these embodiments, if either (i) the conditions defined in equations (42) and (43) are met or (ii) the conditions defined in equations (44) and (45) are met, the search engine 14 sets the ImageScores$_i$ for these images to a value within the rectangular region 171 shown in FIG. 27. In this way, these embodiments ensure that the search engine 14 will not retrieve extreme images in which one of the visual weight contribution to the ImageScore$_i$ or the color contribution to the ImageScore$_i$ is below an empirically determined level needed for an acceptable image.

Figure 28:
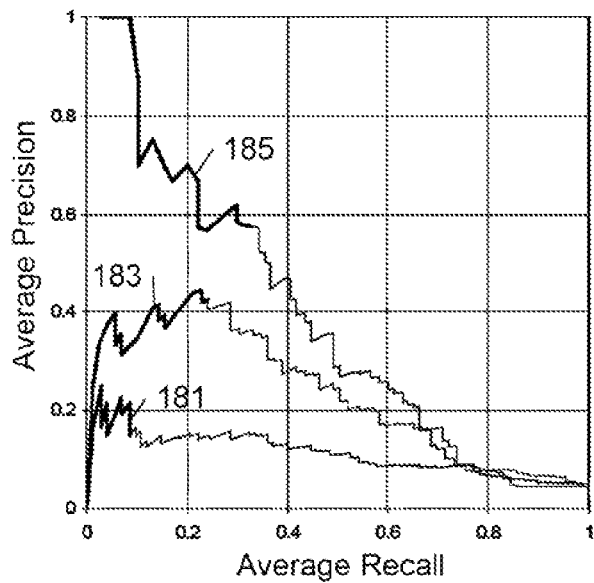
FIG. 28 is a graph showing three different precision-recall curves.

FIG. 28 shows three different average precision-recall curves in a document-based image query application environment. Here, precision indicates how many of the returned images are correct (true) and recall indicates how many of the correct (true) images the search engine 14 returns. The precision-recall curve 181 measures the performance of the search engine 14 when only color model parameters are used in the image scoring function, the precision-recall curve 183 measures the performance of the search engine 14 when only visual weight model parameters are used in the image scoring function, and the precision-recall curve 185 measures the performance of the search engine 14 when the joint visual weight and color image scoring function described above is used by the search engine 14. FIG. 28 illustrates the improved search engine performance that results from the use of the joint scoring function, which captures isolated high quality regions in the visual quality map that visually balance the document, along with the color tonalities that fulfill that desired analogous color harmony.

V. Exemplary Architecture of the Compositional Balance and Color Driven Content Retrieval System Embodiments of the compositional balance and color driven content retrieval system 10 may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by is a respective set of multiple data processing components.

In some implementations, process instructions (e.g., machine-readable code, such as computer software) for implementing the methods that are executed by the embodiments of the compositional balance and color driven content retrieval system 10, as well as the data is generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the compositional balance and color driven content retrieval system 10 may be implemented in any one of a wide variety of electronic devices, including desktop computers, workstation computers, and server computers.

Figure 29:
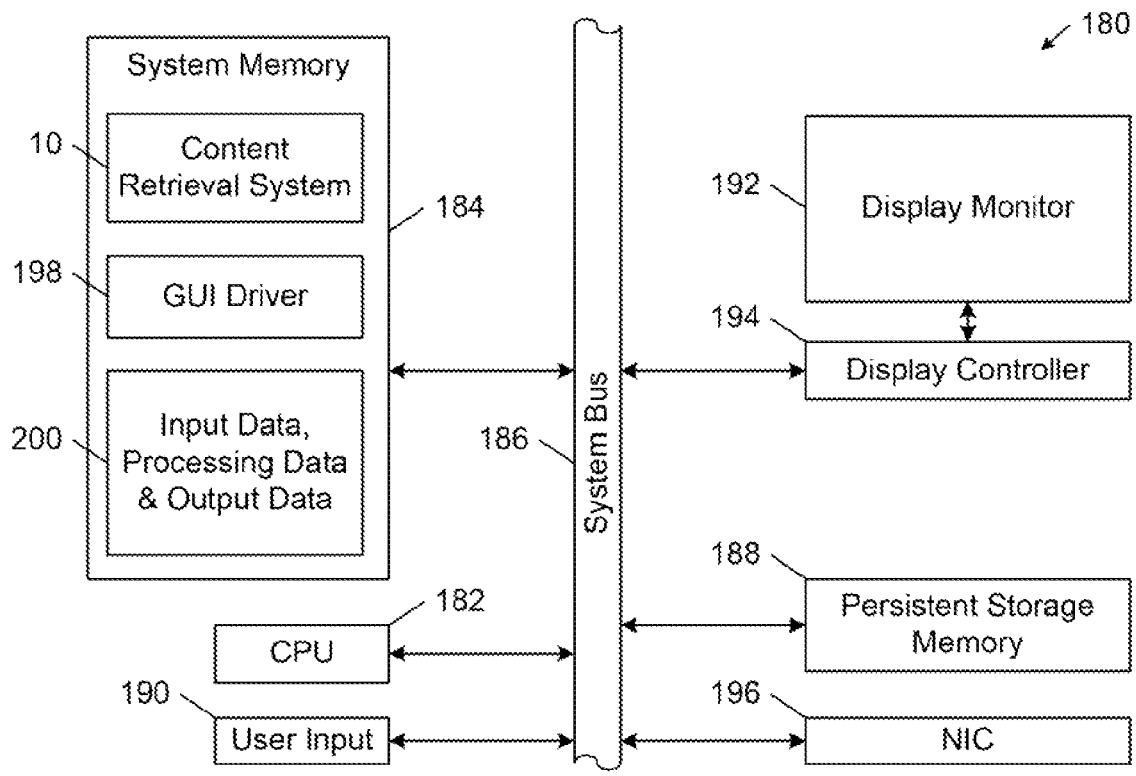
FIG. 29 is a block diagram of an embodiment of a computer system that implements an embodiment of the compositional balance and color driven content retrieval system of FIG. 1.

FIG. 29 shows an embodiment of a computer system 180 that can implement any of the embodiments of the compositional balance and color driven content retrieval system 10 that are described herein. The computer system 180 includes a processing unit 182 (CPU), a system memory 184, and a system bus 186 that couples processing unit 182 to the various components of the computer system 180. The processing unit 182 typically includes one or more processors, each of which may be in the form of any one of various commercially available processors. The system memory 184 typically includes a read only memory (ROM) that stores a basic input/output system (BIOS) that contains start-up routines for the computer system 180 and a random access memory (RAM). The system bus 186 may be a memory bus, a peripheral bus or a local bus, and may be compatible with any of a variety of bus protocols, including Peripheral Component Interconnect (PCI), Video Electronics Standards Association (VESA), Microchannel, Industry Standard Architecture (ISA), and Extended Industry Standard Architecture (EISA). The computer system 60 also includes a persistent storage memory 188 (e.g., a hard drive, a floppy drive, a CD ROM drive, magnetic tape drives, flash memory devices, and digital video disks) that is connected to the system bus 186 and contains one or more computer-readable media disks that provide non-volatile or persistent storage for data, data structures and computer-executable instructions.

A user may interact (e.g., enter commands or data) with the computer 180 using one or more input devices 190 (e.g., a keyboard, a computer mouse, a microphone, joystick, and touch pad). Information may be presented through a graphical user interface (GUI) that is displayed to the user on a display monitor 192, which is controlled by a display controller 194. The computer system 60 also typically includes peripheral output devices, such as speakers and a printer. One or more remote computers may be connected to the computer system 180 through a network interface card (NIC) 196.

As shown in FIG. 29, the system memory 184 also stores the compositional balance and color driven content retrieval system 10, a GUI driver 198, and at least one database 200 containing input data, processing data, and output data. In some embodiments, the compositional balance and color driven content retrieval system 10 interfaces with the GUI driver 198 and the user input 190 to present a user interface for managing and controlling the operation of the compositional balance and color driven content retrieval system 10.

VI. Conclusion

The embodiments that are described in detail herein are capable of retrieving images (e.g., digital photographs, video frames, scanned documents, and other image-based graphic objects including mixed content objects) based on specified compositional balance and color criteria. In some of these embodiments, images are indexed in accordance with models of their respective distributions of visual weight and color. Images are retrieved based on comparisons of their associated visual weight and color based indices with the parameters of the compositional balance and color driven image queries.

Some embodiments are able to generate compositional balance and color driven queries from analyses of the distributions of visual weight and color in a document and a specified compositional balance objective. In this way, these embodiments may be used, for example, in digital publishing application environments to automatically retrieve one or more images that have colors that harmonize with a document under construction and that satisfy a compositional balance objective for the document.

Other embodiments are within the scope of the claims.

What is claimed is:

1. A method, comprising:
   determining for each of multiple images a respective model of visual weight in the image and a respective model of color in the image, wherein
   each model of visual weight comprises a respective set of parameters defining a centroid of visual weight of the respective image as a whole and a spread of visual weight in the respective image about the centroid, and
   each model of color comprises, for each of multiple image regions of the respective image, a respective set of parameters defining a respective centroid of the respective image region, a respective color of the respective image region, and a respective size of the respective image region;
   generating an image query from a target visual weight distribution and a target color template;
   calculating for each of the images a respective score from the image query, the respective visual weight model, and the respective color model; and
   retrieving at least one of the images from a database based on the respective scores.

2. The method of claim 1, wherein the determining comprises for each of the images
   identifying areas of the image highest in visual appeal, and
   building the respective model of visual weight in the image to approximate a distribution of the identified areas of the image.

3. The method of claim 1, wherein the determining comprises for each of the images
   segmenting the image into regions, and
   labeling each of the regions with a respective color.

4. The method of claim 3, wherein the determining additionally comprises for each of the images
   calculating a respective centroid and a respective size for ones of the labeled regions, and
   building the respective color model from the calculated centroids and the calculated sizes.

5. The method of claim 1, wherein the calculating comprises for each of the images calculating the respective score from a respective visual weight comparison value and a respective color comparison value, the respective visual weight comparison value compares the target visual weight distribution and the respective visual weight model of the image, and the color comparison value compares the target color template and the respective color model of the image.

6. The method of claim 5, wherein the calculating comprises for each of the images
   calculating the respective visual weight comparison value from a measure of distance between the target visual weight distribution and the respective visual weight model of the image, and
   calculating the respective color comparison value from a measure of distance between the target color template and the respective color model of the image.

7. The method of claim 5, wherein the calculating comprises for each of the images calculating the respective score from an evaluation of a joint scoring function that involves a multiplication together of the respective visual weight comparison value and the respective color comparison value.

8. The method of claim 5, wherein:
   the retrieving comprises identifying one or more of the images having greatest likelihood of matching the image query based on the respective scores and retrieving the one or more identified images; and
   the calculating comprises
   adjusting the respective scores to reduce likelihoods of matching the image query to ones of the images having respective scores that meet a high likelihood of match predicate and respective visual weight comparison values that meet a low likelihood of visual weight match predicate, and adjusting the respective scores to reduce likelihoods of matching the image query to ones of the images having respective scores that meet the high likelihood of match predicate and respective color comparison values that meet a low likelihood of color match predicate.

9. The method of claim 1, wherein the generating comprises constructing the target visual weight distribution from a model of visual weight in a document, wherein the constructing comprises calculating a center of visual weight in the document and determining the model of visual weight in the document based on the calculated center of visual weight.

10. The method of claim 9, wherein
the generating comprises producing the image query from the model of visual weight in the document in accordance with a compositional balance objective for the document, and
the producing comprises geometrically transforming the model of visual weight in the document in accordance with the compositional balance objective to produce the target visual weight distribution.

11. The method of claim 1, wherein the generating comprises constructing the target color template from a document, wherein the constructing comprises
segmenting the document into regions,
labeling each of the regions with a respective color,
calculating a respective centroid and a respective size for one or more of the labeled regions, and
building the target color template from the calculated centroids and the calculated sizes.

12. The method of claim 11, wherein the calculating comprises for each of the images calculating the respective score from a respective measure of distance between the target color template and the respective color model of the image positioned in a designated target location in the document.

13. A non-transitory machine readable medium storing machine-readable instructions causing a machine to perform operations comprising:
determining for each multiple images a respective model of visual weight in the image and a respective model of color in the image, wherein
each model of visual weight comprises a respective set of parameters defining a centroid of visual weight of the respective image as a whole and a spread of visual weight in the respective image about the centroid, and
each model of color comprises, for each of multiple image regions of the respective image, a respective set of parameters defining a respective centroid of the respective image region, a respective color of the respective image region, and a respective size of the respective image region;
generating an image query from a target visual weight distribution and a target color template;
calculating for each of the images a respective score from the image query, the respective visual weight model, and the respective color model; and
retrieving at least one of the images from a database based on the respective scores.

14. The machine readable medium of claim 13, wherein, for each of the images, the machine-readable instructions cause the machine to perform operations comprising
segmenting the image into regions,
labeling each of the regions with a respective color
calculating a respective centroid and a respective size for ones of the labeled regions, and
building the respective color model from the calculated centroids and the calculated sizes.

15. The machine readable medium of claim 13, wherein, for each of the images, the machine-readable instructions cause the machine to perform operations comprising calculating the respective score from a respective visual weight comparison value and a respective color comparison value, wherein the respective visual weight comparison value compares the target visual weight distribution and the respective visual weight model of the image, and the color comparison value compares the target color template and the respective color model of the image.

16. The machine readable medium of claim 15, wherein, for each of the images, the machine-readable instructions cause the machine to perform operations comprising
calculating the respective visual weight comparison value from a measure of distance between the target visual weight distribution and the respective visual weight model of the image, and
calculating the respective color comparison value from a measure of distance between the target color template and the respective color model of the image.

17. The machine readable medium of claim 15, wherein, for each of the images, the machine-readable instructions cause the machine to perform operations comprising calculating the respective score from an evaluation of a joint scoring function that involves a multiplication together of the respective visual weight comparison value and the respective color comparison value.

18. An apparatus, comprising:
a memory storing processor-readable instructions;
a processor coupled to the memory, operable to execute the instructions, and based at least in part on the execution of the instructions operable to perform operations comprising
determining for each image of multiple images a respective model of visual weight in the image and a respective model of color in the image, wherein each model of visual weight comprises a respective set of parameters defining a centroid of visual weight of the respective image as a whole and a spread of visual weight in the respective image about the centroid, and each model of color comprises, for each of multiple image regions of the respective image, a respective set of parameters defining a respective centroid of the respective image region, a respective color of the respective image region, and a respective size of the respective image region,
generating an image query from a target visual weight distribution and a target color template,
calculating for each of the images a respective score from the image query, the respective visual weight model, and the respective color model, and
retrieving at least one of the images from a database based on the respective scores.

19. The apparatus of claim 18, wherein based at least in part on the execution of the instructions the processor is operable to perform, for each of the images, operations comprising
segmenting the image into regions,
labeling each of the regions with a respective color
calculating a respective centroid and a respective size for ones of the labeled regions, and
building the respective color model from the calculated centroids and the calculated sizes.

20. The apparatus of claim 18, wherein based at least in part on the execution of the instructions the processor is operable to perform, for each of the images, operations comprising calculating the respective score from a respective visual weight comparison value and a respective color comparison value, wherein the respective visual weight comparison value compares the target visual weight distribution and the respective visual weight model of the image, and the color comparison value compares the target color template and the respective color model of the image.

21. The apparatus of claim 20, wherein based at least in part on the execution of the instructions the processor is operable to perform, for each of the images, operations comprising calculating the respective visual weight comparison value from a measure of distance between the target visual weight distribution and the respective visual weight model of the image, and calculating the respective color comparison value from a measure of distance between the target color template and the respective color model of the image.

22. The apparatus of claim 20, wherein based at least in part on the execution of the instructions the processor is operable to perform, for each of the images, operations comprising calculating the respective score from an evaluation of a joint scoring function that involves a multiplication together of the respective visual weight comparison value and the respective color comparison value.

* * * * *

UNITED STATES PATENT AND TRADEMARK OFFICE
CERTIFICATE OF CORRECTION

| | | |
|---|---|---|
| PATENT NO. | : 7,917,518 B2 | Page 1 of 1 |
| APPLICATION NO. | : 11/781178 | |
| DATED | : March 29, 2011 | |
| INVENTOR(S) | : Pere Obrador | |

It is certified that error appears in the above-identified patent and that said Letters Patent is hereby corrected as shown below:

In column 25, line 39, in Claim 13, delete "each multiple" and insert -- each of multiple --, therefor.

In column 26, line 34, in Claim 18, delete "each image of" and insert -- each of --, therefor.

Signed and Sealed this
Twenty-seventh Day of March, 2012

David J. Kappos
*Director of the United States Patent and Trademark Office*